US012759716B2

(12) United States Patent
Sibbach et al.

(10) Patent No.: US 12,759,716 B2
(45) Date of Patent: Oct. 13, 2026

(54) BLENDED WING AIRCRAFT WITH BOUNDARY LAYER INGESTION FEATURES AND BODY/ENGINE SHIELDING FEATURES

(71) Applicant: General Electric Company, Evendale, OH (US)

(72) Inventors: Arthur William Sibbach, Boxford, MA (US); Daniel Alan Niergarth, Norwood, OH (US); Erich Alois Krammer, West Chester, OH (US); Brandon Wayne Miller, Middletown, OH (US); James Laverty, Lancaster, PA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/010,680

(22) Filed: Jan. 6, 2025

(65) Prior Publication Data

US 2026/0192931 A1 Jul. 9, 2026

(51) Int. Cl.

*B64D 29/04* (2006.01)
*B64C 39/10* (2006.01)
*B64D 33/02* (2006.01)

(52) U.S. Cl.

CPC ........ *B64D 29/04* (2013.01); *B64C 2039/105* (2013.01); *B64D 2033/0226* (2013.01); *B64D 2033/0253* (2013.01)

(58) Field of Classification Search

CPC ............ B64D 29/04; B64D 2033/0226; B64D 2033/0253; B64C 2039/105

See application file for complete search history.

(56) References Cited

U.S. PATENT DOCUMENTS

| | | | |
|---|---|---|---|
| 2,406,506 | A | 8/1946 | Northrop |
| 2,504,137 | A | 4/1950 | Lewis |
| 4,019,699 | A | 4/1977 | Wintersdorff et al. |
| 5,897,078 | A | 4/1999 | Burnham et al. |

(Continued)

FOREIGN PATENT DOCUMENTS

| | | | |
|---|---|---|---|
| CN | 215064070 U | 12/2021 | |
| EP | 3287371 A1 * | 2/2018 | ............ B64D 29/04 |

(Continued)

OTHER PUBLICATIONS

Koenig, Air Force Awards a Start-Up Company $235 Million to Build an Example of a Sleek New Plane, AP News, 2023, 2 Pages. https://apnews.com/article/air-force-aviation-streamlined-plane-blended-wing-2a1704dbe8a3ac112f36220eafe291fa.

*Primary Examiner* — Valentina Xavier
(74) *Attorney, Agent, or Firm* — Dority & Manning, P.A.

(57) ABSTRACT

In one aspect, a blended wing aircraft includes a blended wing body and an engine including a nacelle defining an inlet and an outlet. The engine further includes a fan positioned within the nacelle between the inlet and the outlet, with the engine being supported relative to the blended wing body such that the inlet of the nacelle is configured to receive boundary layer air from the blended wing body. In addition, the blended wing aircraft includes a plurality of surface features positioned upstream of the fan, with each surface feature of the plurality of surface features comprising a projection extending outwardly from an adjacent surface of the blended wing aircraft such that the projection is configured to interact with the boundary layer air.

19 Claims, 19 Drawing Sheets

(56) References Cited

U.S. PATENT DOCUMENTS

| | | | | |
|---|---|---|---|---|
| 6,050,527 | A * | 4/2000 | Hebert | B64C 23/00 244/209 |
| 6,382,562 | B1 | 5/2002 | Whitlock et al. | |
| 6,568,632 | B2 | 5/2003 | Page et al. | |
| 6,708,924 | B2 | 3/2004 | Page et al. | |
| 6,851,650 | B2 | 2/2005 | Sankrithi | |
| 6,923,403 | B1 | 8/2005 | Dizdarevic et al. | |
| 7,509,797 | B2 | 3/2009 | Johnson | |
| 7,644,888 | B2 | 1/2010 | Eakins et al. | |
| 7,665,689 | B2 | 2/2010 | McComb | |
| 7,686,257 | B2 * | 3/2010 | Saddoughi | F15D 1/12 244/203 |
| 7,793,884 | B2 | 9/2010 | Dizdarevic et al. | |
| 8,104,717 | B2 | 1/2012 | Wakayama et al. | |
| 8,128,023 | B2 | 3/2012 | Cazals | |
| 8,251,310 | B2 | 8/2012 | Marche et al. | |
| 8,317,129 | B1 | 11/2012 | Lawson et al. | |
| 8,366,050 | B2 | 2/2013 | Odle et al. | |
| 8,616,492 | B2 | 12/2013 | Oliver | |
| 8,783,611 | B2 | 7/2014 | Peryea et al. | |
| 9,016,040 | B2 | 4/2015 | Stuart et al. | |
| 9,567,075 | B2 | 2/2017 | Tighe | |
| 9,815,559 | B2 | 11/2017 | Moxon | |
| 10,711,631 | B2 * | 7/2020 | Suciu | F01D 7/00 |
| 11,247,776 | B2 | 2/2022 | Princen et al. | |
| 11,312,491 | B2 | 4/2022 | Morris et al. | |
| 11,396,365 | B2 | 7/2022 | Page | |
| 11,453,483 | B2 | 9/2022 | Page | |
| 11,498,660 | B2 | 11/2022 | Florea et al. | |
| 11,511,854 | B2 | 11/2022 | Baity et al. | |
| 11,572,838 | B2 | 2/2023 | Miller et al. | |
| 11,597,501 | B2 | 3/2023 | Page | |
| 11,597,510 | B2 | 3/2023 | Robertson et al. | |
| 11,608,173 | B2 | 3/2023 | McCullough et al. | |
| 11,827,339 | B1 | 11/2023 | Page | |
| 11,878,798 | B2 | 1/2024 | Atreya et al. | |
| 11,926,410 | B2 | 3/2024 | Page et al. | |
| 2007/0023571 | A1 | 2/2007 | Kawai et al. | |
| 2007/0241229 | A1 * | 10/2007 | Silkey | B64D 33/02 244/53 A |
| 2011/0271824 | A1 | 11/2011 | Wahlquist | |
| 2016/0009391 | A1 | 1/2016 | Friesel | |
| 2016/0122005 | A1 | 5/2016 | Florea et al. | |
| 2016/0144972 | A1 | 5/2016 | Florea et al. | |
| 2018/0362169 | A1 | 12/2018 | Du | |
| 2019/0276135 | A1 | 9/2019 | van Merkensteijn, IV | |
| 2020/0307789 | A1 * | 10/2020 | Princen | B64D 33/06 |
| 2020/0331591 | A1 | 10/2020 | Page et al. | |
| 2022/0194569 | A1 | 6/2022 | Georgeson et al. | |
| 2023/0002037 | A1 | 1/2023 | Page | |
| 2023/0029560 | A1 | 2/2023 | Stefes | |
| 2023/0242254 | A1 | 8/2023 | Page | |
| 2023/0278706 | A1 | 9/2023 | Page et al. | |
| 2023/0322382 | A1 * | 10/2023 | Dindar | B64C 21/01 244/36 |
| 2025/0214703 | A1 * | 7/2025 | Morton | B64C 5/02 |

FOREIGN PATENT DOCUMENTS

| | | | | |
|---|---|---|---|---|
| EP | 3412563 | A1 * | 12/2018 | F02C 7/042 |
| EP | 3620387 | A1 * | 3/2020 | F02K 3/06 |
| FR | 2909358 | A1 | 6/2008 | |
| FR | 2938823 | A1 | 5/2010 | |
| FR | 2938824 | A1 | 5/2010 | |
| GB | 759491 | A | 10/1956 | |
| WO | WO2007/104940 | A1 | 9/2007 | |
| WO | WO2021/118401 | A1 | 6/2021 | |

* cited by examiner

BLENDED WING AIRCRAFT WITH BOUNDARY LAYER INGESTION FEATURES AND BODY/ENGINE SHIELDING FEATURES

FIELD

The present subject matter generally relates to a blended wing aircraft and, more particularly, to boundary layer ingestion features and body/engine shielding features for use with a blended wing aircraft.

BACKGROUND

Traditional aircraft designs include a fuselage and a pair of wings. The fuselage is a central body of the aircraft that holds passengers, cargo, equipment, and the like. The wings are attached to the fuselage and are the primary lift-generating surfaces, particularly during constant-altitude flight operations. In contrast, blended wing aircraft have been developed that included a blended wing body in which the fuselage and wings are smoothly blended together, with no clear division or dividing line between the fuselage/wings. While traditional aircraft have been designed and re-designed over-and-over again through the years, various features and aspects of blended wing aircraft are still being developed and improved for this newer aircraft configuration. In this regard, improvements and/or advancements for blended wing aircraft that help address issues associated with boundary layer ingestion and/or damage prevention to the body/engine would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
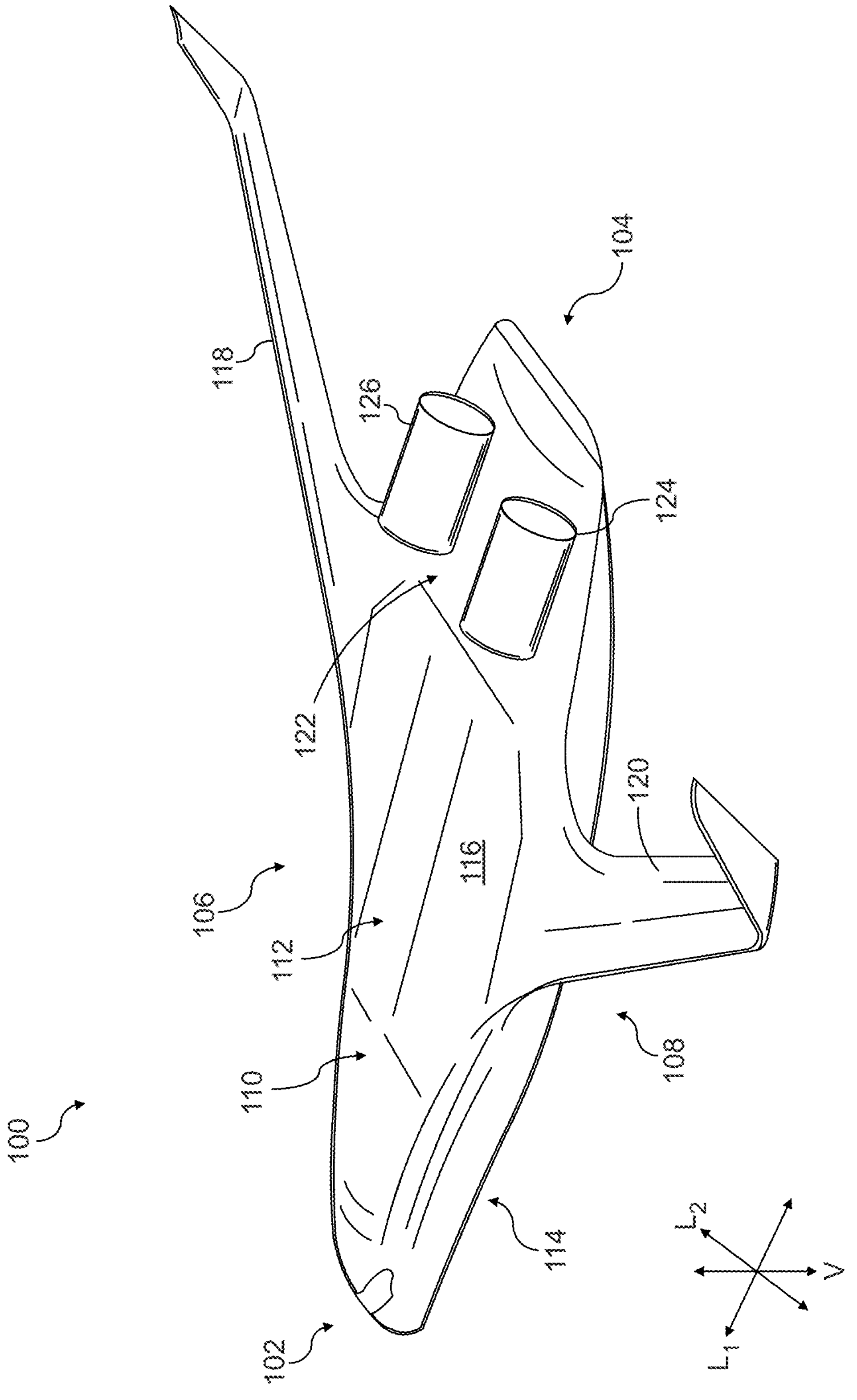
FIG. 1 illustrates a perspective view of one embodiment of an aircraft in accordance with aspects of the present subject matter, particularly illustrating the aircraft configured as a blended wing body (BWB) aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "forward" and "aft" refer to relative positions within a gas turbine engine or vehicle, and are based on a normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

In general, the present subject matter is directed to a blended wing aircraft and related features for blended wing aircraft. For instance, in one aspect, the present subject matter is directed to a blended wing aircraft having one or more engines configured to ingest or receive boundary layer air flowing along or across the body of the aircraft. In such instance, the aircraft may include one or more surface features positioned upstream of the fan or fan assembly of each engine, with such surface features being configured to interact with the flow of boundary layer air. The surface features may correspond to projections (e.g., fins, vanes, and/or like) that project or extend outwardly from an adjacent surface of the aircraft to allow the surface features to interact with the boundary layer air being directed towards the inlet of the nacelle of each engine or the boundary layer air actually flowing through the nacelle, reducing the impact of the boundary layer ingestion within the engine (e.g., by preventing a stalled condition). For instance, the surface features may be configured to reduce the amount of turbulence in the boundary layer air, such as by straightening the flow of boundary layer air and/or be introducing an amount of pre-swirl into the boundary layer air at a location of upstream of the respective fan.

In one embodiment, the surface features may be positioned upstream of the inlet of the nacelle of each engine. For instance, surface features may be installed or positioned along an outer surface of the body of the blended wing aircraft such that the surface features are configured to interact with the boundary layer air prior to such airflow being directed into the nacelle inlet. In addition to such body-based surface features (or as an alternative thereto), surface features may be installed or positioned within the nacelle at a location downstream of the nacelle inlet (but upstream for the fan). For instance, the surface features may be configured to extend or project outwardly from an inner surface of the nacelle at a location upstream of the fan.

Additionally, as will be described below, the disclosed surface features may be provided in various different sizes (e.g., lengths), shapes, and/or orientations. For instance, in one embodiment, the surface features may have a lengthwise orientation that is parallel or skewed relative to an axial centerline of the adjacent engine. Moreover, the surface features may be used with various different engine arrangements in which boundary layer ingestion will occur. For instance, as will be described below, the surface features may be utilized with engines in which the nacelle inlet is positioned substantially flush with an adjacent outer surface of the aircraft body or recessed relative to such outer surface of the body.

In another aspect, the present subject matter is directed to shielding-related features for a blended wing aircraft. For instance, the shielding-related features may be configured to protect the aircraft (including the blended wing body and the engines) from damage caused by kinetic forces originating from an engine, such as when fragments of a rotary component of the engine are thrown or directed outwardly from the engine due to rotary failure or component failure. As an example, the shielding-related features may be utilized to prevent damage in the event fragments of one or more rotating airfoils of the engine (e.g., fan blades, turbine blades, etc.) are thrown or expelled outwardly therefrom.

As will be described below, in one embodiment, one or more shielding panels may be utilized as armor for the body of the aircraft. For instance, the shielding panel(s) may be placed within a shielded section of the aircraft body, which may, in one embodiment, be defined based on the relative locations of one or more of the rotating airfoils of each engine. As an example, it may be desirable to include shielding panels within a shielded section that extends in a lengthwise direction from at least the location of the forwardmost rotating airfoil of the engines to at least the location of the aftmost rotating airfoils of the engines. Additionally, in one embodiment, it may be desirable to select the coverage of the shielding panels based on a "spread angle" or "throw angle" across which component fragments may be thrown or expelled from a rotary component of the engine.

In addition to the shielding panels provided in operative association with the aircraft body (or as an alternative thereto), the aircraft may incorporate a shielding tail to protect each engine from fragments or debris being expelled or thrown from the other engine. Specifically, in several embodiments, a shielding tail may be positioned between laterally spaced engines to prevent or minimize cross-engine damage. As will be described below, the longitudinal or lengthwise positioning of the shielding tail may be selected, in certain embodiments, based on the relative positioning of the rotary components of the engines, such as the forwardmost and aftmost rotating airfoils of the engines. Additionally, as will be described below, a height of the shielding tail may be selected based on one or more engine-related dimensions or parameters, such as a dimension (e.g., a radius) of the rotary components of the engines (e.g., a radius of the fan engine or a radius of one or more of the turbine sections of the engine). In addition to the dimension of the rotary components, the height may also be selected based on: the lateral distance defined between the engines; a dimension associated with clearing the opposed engine (e.g., an outer radius of the nacelle of the opposed engine); and/or a rotational direction of the engines.

Referring now to the drawings, wherein identical numerals indicate the same elements throughout the figures, FIG. 1 provides a perspective view of an aircraft 100 as may incorporate various embodiments of the present disclosure. In particular, as will be discussed in greater detail, below, the aircraft 100 of FIG. 1 is configured as a blended wing body aircraft.

The aircraft 100 defines a longitudinal direction L1 that extends therethrough, a lateral direction L2, a vertical direction V, a forward end 102 and an opposing aft end 104 along the longitudinal direction L1, a starboard side 106 and an opposing port side 108 along the lateral direction L2, and a top side 112 and an opposing bottom side 114 along the vertical direction V.

Further, it will be appreciated that the aircraft 100 includes an aircraft body (e.g., a blended wing body 110) extending longitudinally from the forward end 102 of the aircraft 100 to the aft end 104 of the aircraft 100 and laterally from the starboard side 106 to the port side 108. In general, the blended wing body 110 may generally define an outer flowpath surface (or simply "outer surface 116") of the aircraft 100. As will be described below, boundary layer air may be directed along the outer surface 116 of the blended wing body 110. Additionally, as shown in FIG. 1, the blended wing body 110 includes a pair of wings. In particular, the body 110 includes a first wing 118 and a second wing 120. The first wing 118 extends outwardly from the central or fuselage portion of the blended wing body 110 generally along the lateral direction L2 on the starboard side 106 and the second wing 120 similarly extends outwardly from the central or fuselage portion of the blended wing body 110 generally along the lateral direction L2 on the port side 108. Although not depicted, it will be appreciated that each of the wings 118, 120 may include one or more leading edge flaps, one or more trailing edge flaps, or both.

The exemplary aircraft 100 of FIG. 1 also includes a propulsion system 122. The exemplary propulsion system 122 depicted includes a plurality of engines, and more specifically includes a first engine 124 and a second engine 126. In the embodiment depicted, the first engine 124 and the second engine 126 are spaced from one another along the lateral direction L2, and are mounted to the body 110 of the aircraft 100 at the aft end 104 of the aircraft 100. It will be appreciated, that as used herein, the term "at the aft end 104" refers to a location along the longitudinal direction L1 closer to the aft end 104 of the aircraft 100 than the forward end 102 of the aircraft 100. Briefly, it will further be appreciated that for the embodiment depicted, the first engine 124 and second engine 126 are mounted to the body 110 of the aircraft 100 on the top side 112 of the aircraft 100.

As noted above, the aircraft 100 is configured as a blended wing body aircraft. In such a manner, it will be appreciated that the central or fuselage portion of the blended wing body 110 is generally shaped like an airfoil, so that such portion of the body 110 generates upward lift (along the vertical direction V) during steady altitude flight operations. For example, during a cruise operating condition of the aircraft 100, the central or fuselage portion of the body 110 may contribute between 25% and 95% of the upward lift for the aircraft 100, such as between 35% and 90% of the upward lift for the aircraft 100, with the remainder being provided by the first and second wings 118, 120 of the blended wing body 110. In addition, the first and second wings 118, 120 are aerodynamically contoured to have a smooth transition with the central or fuselage portion of the blended wing body 110 of the aircraft 100, which can reduce an overall drag on the aircraft 100.

Figure 2:
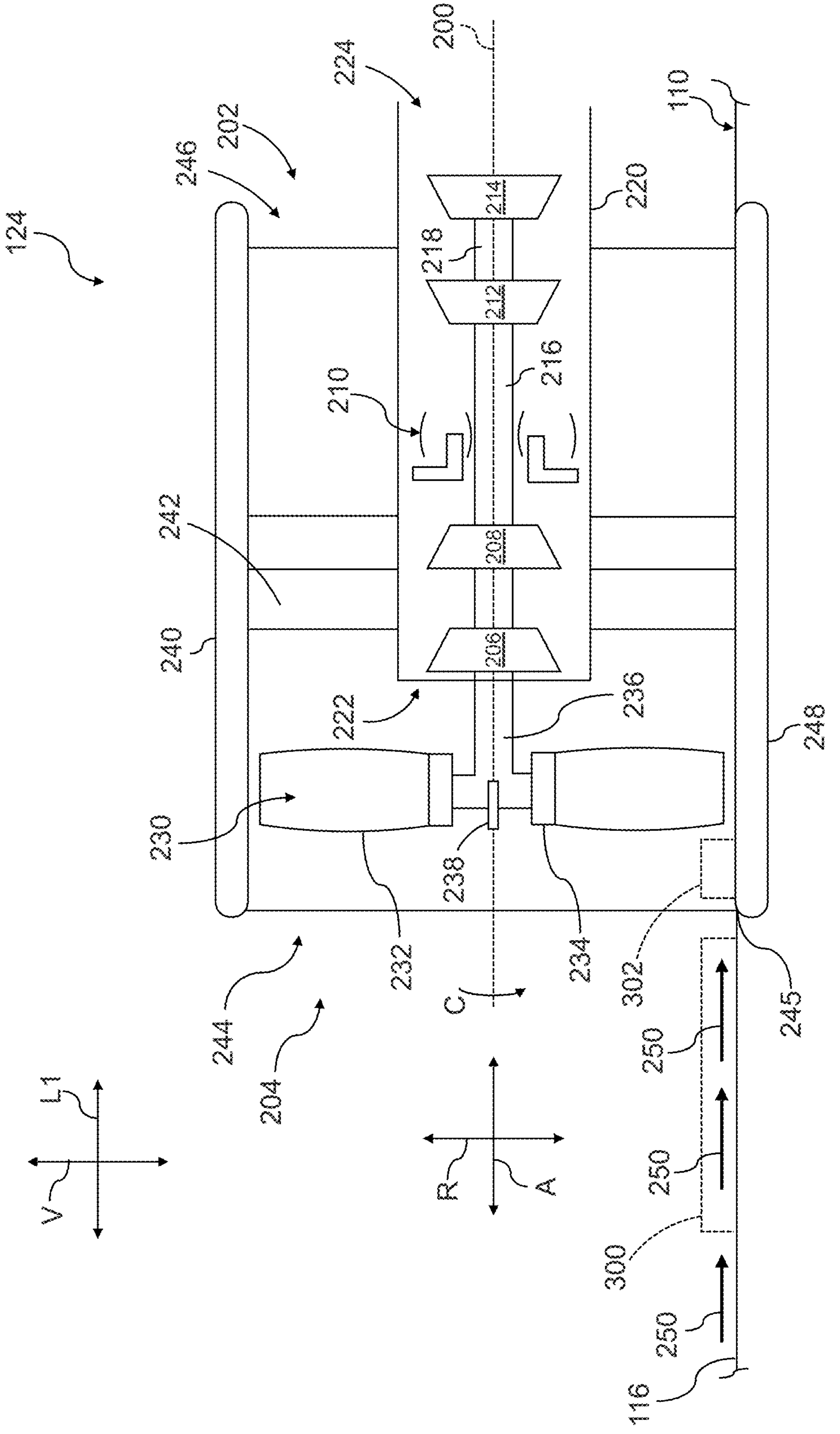
FIG. 2 illustrates a schematic, cross-sectional view of one embodiment of a first engine of the aircraft shown in FIG. 1 in accordance with aspects of the present subject matter, particularly illustrating the engine supported relative to the blended wing body of the aircraft such that the engine is configured to ingest boundary layer air flowing along the outer surface of the body.

Referring now to FIG. 2, a schematic, cross-sectional view of one embodiment of an engine configured for use with an aircraft is illustrated in accordance with aspects of the present subject matter. For purposes of description, the engine shown in FIG. 2 will be described with reference to the first engine 124 of the aircraft 100 shown and described above with reference to FIG. 1. However, it should be appreciated that the illustrated engine configuration may also be applicable to the second engine 126 of the aircraft 100 shown and described above with reference to FIG. 1.

As shown in FIG. 2, the engine 124 generally extends axially (e.g., along axial direction A) along a centerline 200 of the engine. In general, the engine 124 includes a turbomachine 202 comprising a fan assembly 204, a low pressure compressor 206, a high pressure compressor 208, a combustion section 210, a high pressure turbine 212, and a low pressure turbine 214. The turbomachine 202 is supported within a turbomachine casing 220 extending axially between a turbomachine inlet 222 and a turbomachine exhaust 224. As shown in FIG. 2, the combustion section 210 is positioned axially between the high pressure compressor 208 and the high pressure turbine 212, with the high pressure compressor 208 being connected to the high pressure turbine 212 via a high pressure shaft 216. Similarly, the low pressure turbine 214 (and the low pressure compressor 206) is connected to the fan assembly 204 via a low pressure shaft 218, allowing for the coordinated operation of such components. The various shafts of the engine 124 are generally rotatable about the engine centerline 200 in a circumferential direction C of the engine.

As shown in FIG. 2, the fan assembly 204 includes a fan 230 having fan blades 232 coupled to and extending radially outwardly (e.g., in radial direction R) from a fan disk 234, which is in turn coupled to a fan shaft 236 of the fan assembly 204. The fan shaft 236 extends axially and is operatively connected to a pitch change mechanism 238. The pitch change mechanism 238 can adjust the pitch of the fan blades 232 to control the thrust produced by the fan assembly 204. Additionally, as shown in FIG. 2, the fan assembly 204 is enclosed by an outer nacelle 240 extending axially between an inlet 244 of the nacelle 240 and an outlet 246 at an opposing end of the nacelle 240. Outlet guide vanes 242 are provided within the nacelle 240 downstream of the fan 230 to guide the airflow flowing from the fan 230.

In several embodiments, the engine 124 may be supported relative to the blended wing body 110 of the aircraft 100 such that the engine 124 is configured to receive boundary layer air (indicated by arrows 250) flowing across the outer surface 116 of the blending wing body 110. For example, in the illustrated embodiment, the engine 124 may be supported relative to the blended wing body 110 such that a bottom end 245 of the nacelle inlet 244 is positioned substantially flush with the outer surface 116 of the body 110, which allows a flow of boundary layer air 250 to be received within the inlet 244 of the nacelle 240. However, it should be appreciated that the engine 124 may be supported relative to the blended wing body 110 at other relative positions (e.g., beyond the nacelle inlet 244 being positioned substantially flush with the outer surface 116 of the body 110) while still intaking a flow of boundary layer air 250 at the nacelle 240. For instance, as will be described below, the engine 124 may be supported relative to the blended wing body 110 such that the bottom end 245 of the nacelle inlet 244 is recessed vertically below the outer surface 116 extending past the nacelle 240 on the longitudinal direction L1.

As is generally understood, ingestion of the turbulent boundary layer air 250 flowing across the outer surface 116 of the blended wing body 110 can cause the air to detach from the fan 230 or otherwise lead to a stalled condition. In this regard, in accordance with aspects of the present subject matter, to mitigate the issues (e.g., stall) associated with such boundary layer ingestion, one or more surface features 300, 302 may be positioned upstream of the fan 230 to reduce the amount of turbulence within the incoming boundary layer air 250, such as by configuring the surface features 300, 302 to straighten the flow of boundary layer air 250 and/or by configuring the surface features 300, 302 to introduce swirl into (or "pre-swirl") the flow of boundary layer air 250. For instance, as will be described below (and as shown schematically in dashed lines in FIG. 2), one or more body-based surface features 300 may be positioned upstream of the nacelle inlet 244 and may extend or project outwardly from the outer surface 116 of the blended wing body 110 to allow such surface features 300 to interact with the flow of boundary layer air 250 being directed towards (and into) the nacelle inlet 244. Additionally (or alternatively), as will be described below (and as shown schematically in dashed lines in FIG. 2), one or more nacelle-based surface features 302 may be positioned downstream of the nacelle inlet 244 (and upstream of the fan 230) and may extend or project outwardly from an inner surface 248 of the nacelle 240 to allow such surface features 300 to interact with the flow of boundary layer air 250 being directed into the nacelle inlet 244.

Figure 3:
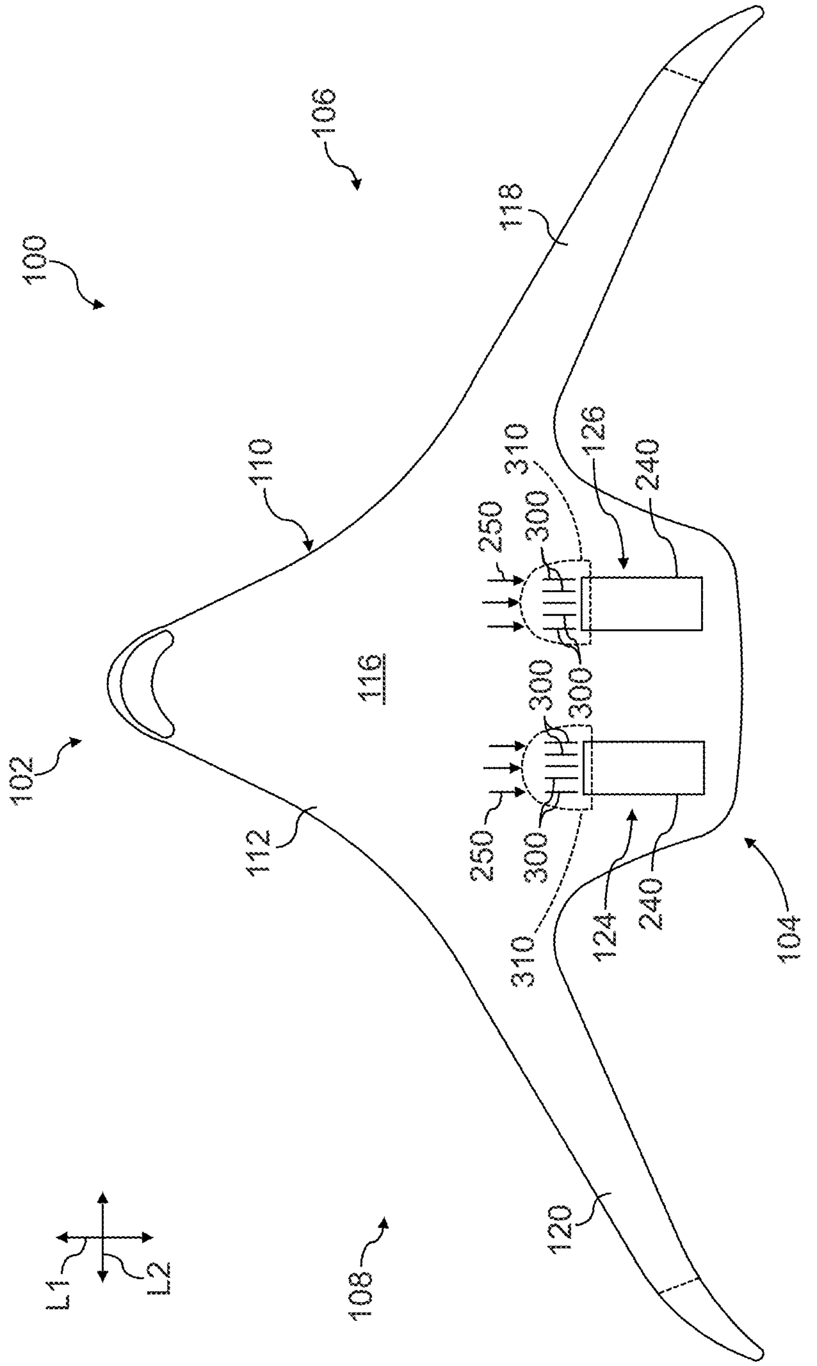
FIG. 3 illustrates a schematic, top view of one embodiment of the aircraft shown in FIG. 1, particularly illustrating the aircraft including a plurality of surface features upstream of the nacelle inlets of both engines so as to interact with the boundary layer air being ingested by the engines in accordance with aspects of the present subject matter.

Referring now to FIG. 3, a schematic, top view of one embodiment of an aircraft is illustrated in accordance with aspects of the present subject matter, particularly illustrating the aircraft including a plurality of body-based surface features. For purposes of discussion, the aircraft will be described with references to the aircraft 100 described above with reference to FIGS. 1 and 2. However, it should be appreciated that the disclosed surface features may generally be utilized with any suitable aircraft having any suitable aircraft configuration, such as any other suitable blended wing aircraft configuration.

As shown in FIG. 3, the aircraft 100 includes a plurality of surface features 300 positioned upstream of the inlet 244

(FIG. 2) of the nacelle 240 of each engine 124, 126 to allow the surface features 300 to interact with the boundary layer air 250 being ingested by the engines. Specifically, in the illustrated embodiment, the surface features are shown as being located within a boundary layer ingestion area (indicated by the dashed area 310) that extends forward or upstream of the engines 124,126 in the longitudinal direction L1 along the body 110 of the aircraft 100. In general, the boundary layer ingestion area 310 encompasses an area of the outer surface 116 of the aircraft body 110 located upstream of the engines 124, 126 across which the boundary layer air 250 being ingested flows before it enters the nacelle inlet 244 of the respective engine 124, 126. As such, by positioning the surface features 300 within the boundary layer ingestion area 310, the surface features 300 may be configured to interact with the boundary layer air 250 flowing over the outer surface 116 of the aircraft body 110 in a manner that alters the flow characteristics of the boundary layer air 250, which enhances aerodynamic efficiency and engine performance by reducing turbulence and potential flow separation issues.

As will be described below, each surface feature 300 may generally be configured to extend outwardly from the outer surface 116 of the aircraft body 110. For instance, each surface feature 300 may be configured as a projection (e.g., a fin, vane, etc.) extending outwardly from the outer surface 116 such that the surface feature 300 is able to condition the boundary layer air 250 before it enters the nacelle 240 of the adjacent engine 124, 126. This flow conditioning can include, for example, straightening and directing the airflow to optimize the ingestion process into the engines 124, 126.

Figure 4A:
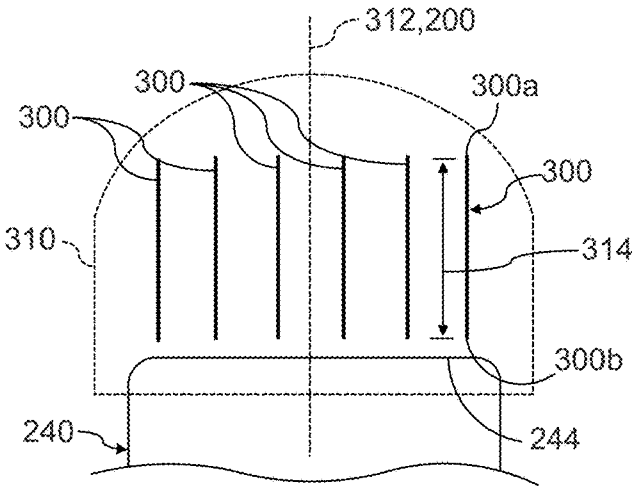
FIG. 4A illustrates a schematic, top-down view of one of the boundary layer ingestion areas shown in FIG. 3, particularly illustrating one embodiment of a plurality of surface features positioned within the boundary layer ingestion area at a location upstream of the inlet of the nacelle in accordance with aspects of the present subject matter.
Figure 4B:
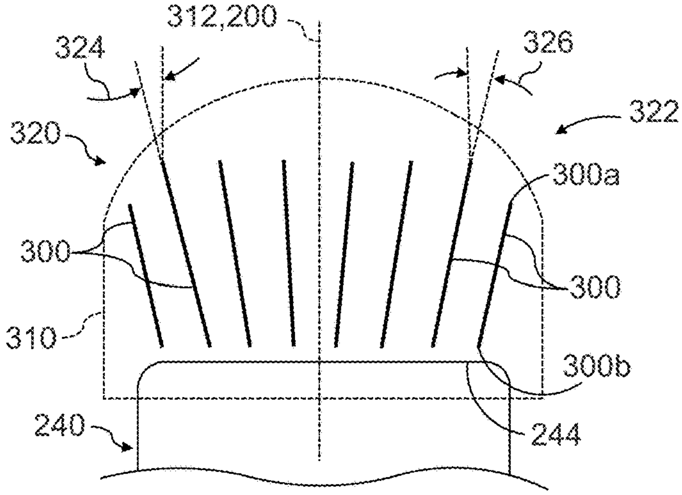
FIG. 4B illustrates a schematic, top-down view of one of the boundary layer ingestion areas shown in FIG. 3, particularly illustrating another embodiment of a plurality of surface features positioned within the boundary layer ingestion area at a location upstream of the inlet of the nacelle in accordance with aspects of the present subject matter.
Figure 4C:
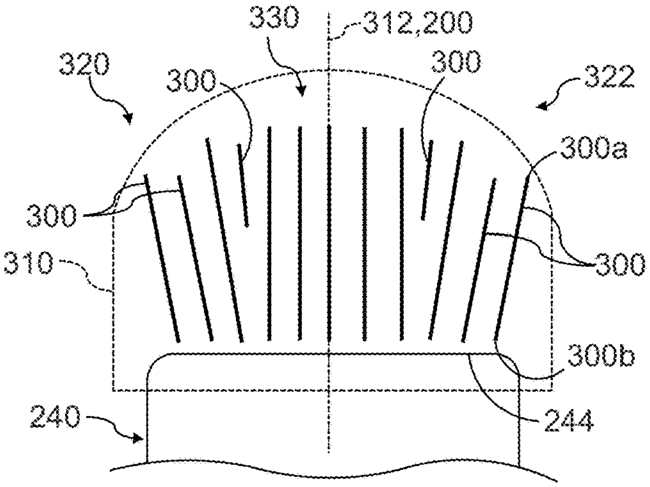
FIG. 4C illustrates a schematic, top-down view of one of the boundary layer ingestion areas shown in FIG. 3, particularly illustrating yet another embodiment of a plurality of surface features positioned within the boundary layer ingestion area at a location upstream of the inlet of the nacelle in accordance with aspects of the present subject matter.

Referring now to FIGS. 4A-4C, various schematic, top-down views of one of the boundary layer ingestion areas 310 shown in FIG. 3 are illustrated, particularly illustrating different embodiments of suitable arrangements (including the placement and orientation) of surface features 300 that may be provided within the boundary layer ingestion 310 area at a location upstream of the nacelle inlet 244 in accordance with aspects of the present subject matter.

As shown in the embodiment of FIG. 4A, the surface features 300 are uniformly distributed across the boundary layer ingestion area 310 at locations upstream of the nacelle inlet 244, with each surface feature 300 extending lengthwise or longitudinally between an upstream end 300*a* positioned furthest away from the nacelle inlet 244 and a downstream end 300*b* positioned closer to the nacelle inlet 244. In the illustrated embodiment, the surface features 300 are oriented parallel to one another, with each surface feature 300 being oriented longitudinally or lengthwise between its upstream and downstream ends 300*a*, 300*b* parallel to a reference line (indicated by line 312). In one embodiment, the reference line 312 may be oriented parallel to the centerline 200 of the adjacent engine 124, 126. Additionally, as shown in FIG. 4A, each surface feature 300 defines a length 314 between its upstream and downstream ends 300*a*, 300*b*. In the illustrated embodiment, the surface features 300 define a uniform length (i.e., each surface feature 300 has the same length). However, in other embodiments, the surface features 300 may have varying lengths 314 to provide differing effects to the flow characteristics of the boundary layer air 250.

Referring now to FIG. 4B, unlike the embodiment described above, an example embodiment is illustrated showing the surface features 300 having a different (e.g. non-parallel) orientation relative to the reference line 312. Specifically, in the illustrated embodiment, the surface features 300 are arranged or organized into a first set of surface features 320 (e.g., the surface features 300 positioned along the left side of the reference line 312) and a second set of surface features 322 (e.g., the surface features 300 positioned along the right side of the reference line 312). As shown in FIG. 4B, while all of the surface features 300 included in the first set of surface features 320 are oriented parallel to one another, such surface features 300 have a skewed or non-parallel orientation relative to the reference line 312 (e.g., by being oriented at a positive skew angle 324 relative to the reference line 312). Similarly, while all of the surface features 300 included in the second set of surface features 322 are oriented parallel to one another, such surface features 300 have a skewed or non-parallel orientation relative to the reference line 312 (e.g., by being oriented at a negative skew angle 326 relative to the reference line 312). In such instance, by arranging the first and second sets of surface features 320, 322 in opposing orientations relative to the reference line 312 (e.g., a positive skew angle vs. a negative skew angle), each surface feature 300 is angled inwardly towards the reference line 312 as it extends between its upstream and downstream ends 300*a*, 300*b*. Additionally, as shown in FIG. 4B, each set of surface features 320, 322 includes surface features 300 of varying lengths defined between their upstream and downstream ends 300*a*, 300*b*. However, in other embodiments, the surface features 300 of each set 320, 322 may define a uniform length.

Referring now to FIG. 4C, a variation of the exemplary embodiments shown in FIGS. 4A and 4B is illustrated, particularly illustrating an arrangement in which some of the surface features 300 are oriented parallel to the reference line 312 and some of the surface features are oriented non-parallel to the reference line 312. Specifically, similar to the embodiment described above with reference to FIG. 4B, first and second sets of surface features 320, 322 are arranged within the boundary layer ingestion area 310 that are skewed or oriented non-parallel to the reference line 312, with the surface features 300 of the first set of surface features 320 being oriented at a positive skew angle 324 (FIG. 4B) relative to the reference line 312 and the surface features 300 of the second set of surface features 322 by being oriented at a negative skew angle 326 (FIG. 4B) relative to the reference line 312. Additionally, a third set of surface features 330 is included within the boundary layer ingestion area 310 at a location between the first and second sets of surface features 320, 322. As shown in FIG. 4C, similar to the embodiment of FIG. 4A, the surface features 300 of the third set 330 are oriented parallel to one another and are also oriented parallel to the reference line 312. As such, the surface features 300 located closest to the reference line 312 are oriented parallel thereto, with the outer or more distal surface features 300 being skewed relative to the reference line 312. Moreover, as shown in FIG. 4C, the various surface features 300 may be configured to define varying lengths (e.g., as in the first and second sets of surface features 320, 322) or uniform lengths (e.g., as in the third set of surface features 330) depending on the desired effect(s) to be provided to the flow characteristics of the boundary layer air.

It should be appreciated that the various embodiments of FIGS. 4A-4C are simply provided to show examples of suitable arrangements for the surface features 300. In general, one of ordinary skill in the art will appreciate that the specific orientations, lengths, number, lateral spacing, etc., of the surface features 300 may be varied or customized to adjust the manner in which the features 300 interact with the incoming air, which allows for the airflow management to be tailored based on specific performance needs or environmental conditions. For example, although the embodiments of FIGS. 4A-4C illustrate the surface features 300 arranged symmetrically relative to the reference line 312, such features 300 may also be arranged asymmetrically relative to the reference line 312. In addition, in certain embodiments, the reference line 312 may be offset from the centerline 200 of the adjacent engine 124, 126.

Referring now to FIGS. 5A-5D, various schematic, side views of differing embodiments of exemplary surface features 300 are illustrated in accordance with aspects of the present subject matter. In each of FIGS. 5A-5D, the illustrated surface feature 300 is shown as extending lengthwise or longitudinally between its upstream end 300*a* and its downstream end 300*b*, with the surface feature 300 defining a length 314 between such upstream and downstream ends 300*a*, 300*b*. Additionally, each illustrated surface feature 300 is shown as extending or projecting outwardly relative to the outer surface 116 of the aircraft body 110 (FIG. 2) between a proximal end 332 positioned at or directly adjacent to the outer surface 116 and a distal end 334 spaced apart from the outer surface 116 such that the surface feature 300 defines a height 336 between its proximal and distal ends 332, 334.

Figure 5A:
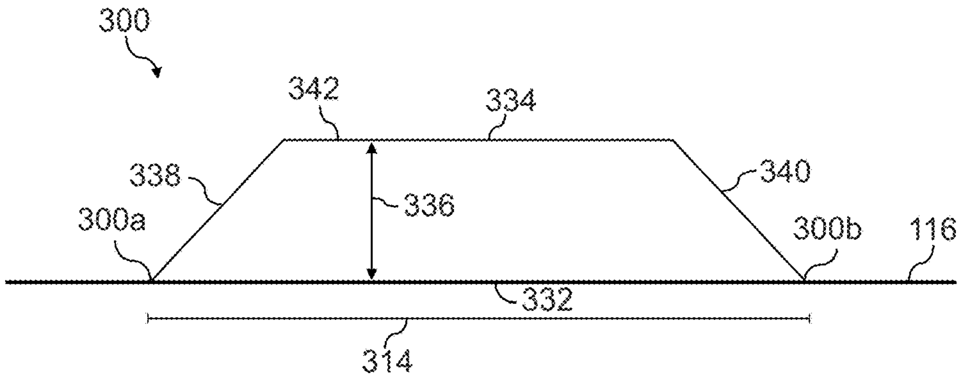
FIG. 5A illustrates a schematic, side profile view of one exemplary embodiment of a surface feature in accordance with aspects of the present subject matter, particularly illustrating the surface feature having a varying height as it extends between its forward and aft ends.

As shown in FIG. 5A, the illustrated surface feature 300 has a varying height 336 or heightwise profile as it extends lengthwise between its upstream and downstream ends 300*a*, 300*b*. Specifically, in the illustrated embodiment, the surface feature 300 includes first and second sloped sections 338, 340 and a constant height section 342 extending between its first and second sloped sections 338, 340. For instance, as shown in FIG. 5A, the first sloped section 338 extends from the upstream end 300*a* of the surface feature 300 and is angled or sloped relative to the outer surface 116 such that the height 336 of the surface feature 300 generally increases as it extends in the lengthwise direction across such sloped section 338. The first sloped section 338 terminates at the constant height section 342 across which the surface feature 300 defines a constant or uniform height 336 as the surface feature 300 extends lengthwise between the first and second sloped sections 338, 340. As shown in FIG. 5A, the second sloped section 340 extends between the end of the constant height section 342 and the downstream end 300*b* of the surface feature 300 and is angled or sloped relative to the outer surface 116 such that the height 336 of the surface feature 300 generally decreases as it extends rearward in the lengthwise direction across such sloped section 340. In the illustrated embodiment, the first and second sloped sections 338, 340 define similar slopes such that each sloped section generally extends lengthwise along the same or a similar portion of the overall length 314 of the surface feature 300.

Figure 5B:
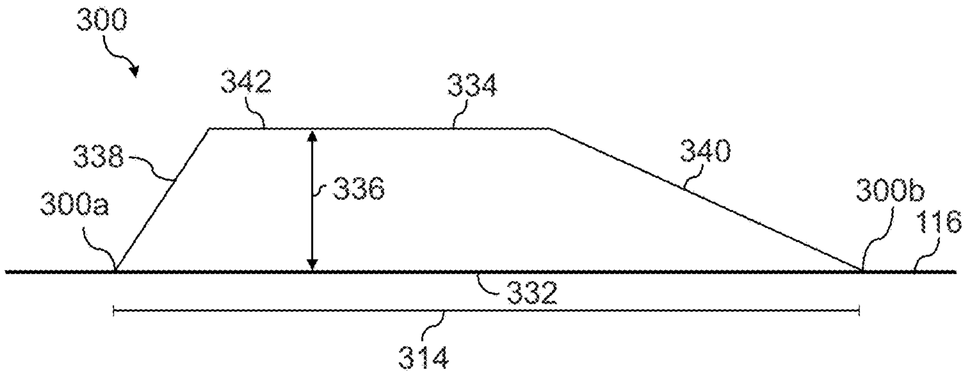
FIG. 5B illustrates a schematic, side profile view of another exemplary embodiment of a surface feature in accordance with aspects of the present subject matter, particularly illustrating the surface feature having a varying height as it extends between its forward and aft ends.

Referring to FIG. 5B, the illustrated surface feature 300 is shown as including a slight variation to the configuration shown in FIG. 5A, namely that differing slopes are defined by the first and second sloped sections 338, 340. Specifically, unlike the embodiment described above with reference to FIG. 5A, the first sloped section 338 defines a steeper slope as compared to the second sloped section 340. As such, the first sloped section 338 exhibits a more abrupt change in height 336 as it extends between the upstream end 300*a* and the constant height section 342, while the second sloped section 340 exhibits a more gradual change in height 336 as it extends between the constant height section 342 and the downstream end 300*b*. However, it should be appreciated that, in other embodiments, the configuration of the surface feature 300 may be reversed, with the second sloped section 340 defining a steeper slope as compared to the first sloped section 338.

Figure 5C:
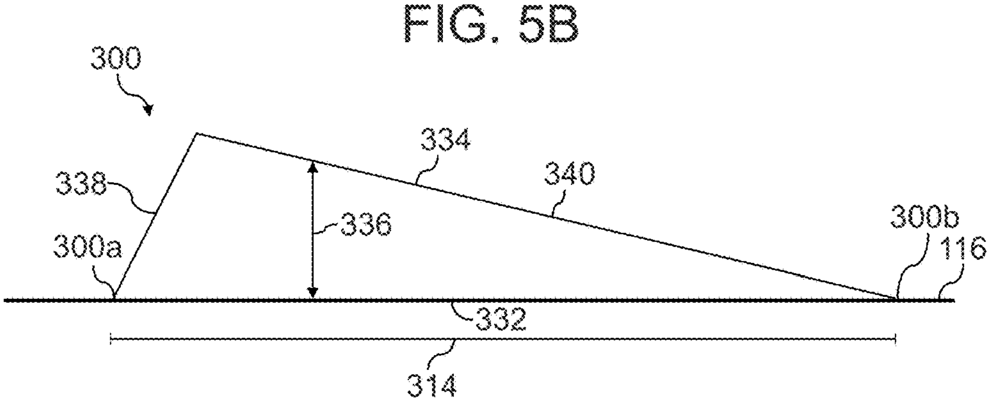
FIG. 5C illustrates a schematic, side profile view of a further exemplary embodiment of a surface feature in accordance with aspects of the present subject matter, particularly illustrating the surface feature having a varying height as it extends between its forward and aft ends.
Figure 5D:
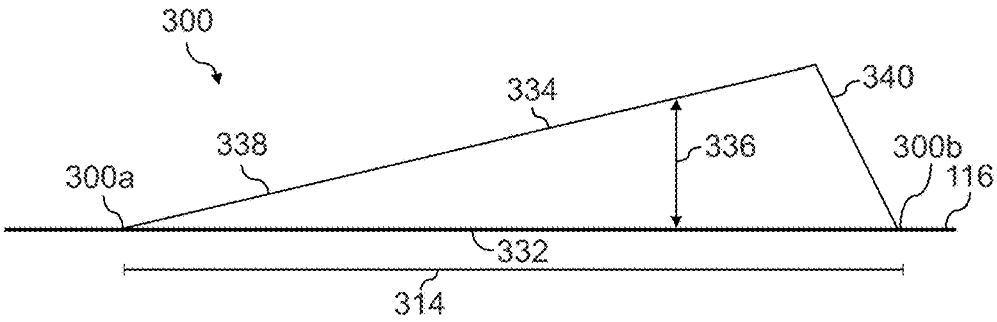
FIG. 5D illustrates a schematic, side profile view of yet another exemplary embodiment of a surface feature in accordance with aspects of the present subject matter, particularly illustrating the surface feature having a varying height as it extends between its forward and aft ends.

Referring now to FIG. 5C, the illustrated surface feature 300 is shown as including another variation to the configurations shown in FIGS. 5A and 5B. Specifically, unlike the embodiments described above with reference to FIGS. 5A and 5B, the surface feature 300 includes first and second sloped sections 338, 340 without incorporating an intermediate constant height section. As such, the first sloped section 338 is generally configured to extend lengthwise from the upstream end 300*a* of the surface feature 300 and terminate at the second sloped section 340, with the second sloped section 340 extending lengthwise from the intersection with the first sloped section 338 to the downstream end 300*b* of the surface feature 300. As shown in FIG. 5C, the first sloped section 338 defines a steeper slope than the second sloped section 340, which provides a more rapid change in height along the forward or upstream end of the surface feature 300. However, in other embodiments, the configuration of the surface feature 300 may be reversed. For instance, FIG. 5D illustrates a variant of the embodiment of the surface feature 300 shown in FIG. 5C in which the second sloped section 340 defines a steeper slope than the first sloped section 338.

Figure 6A:
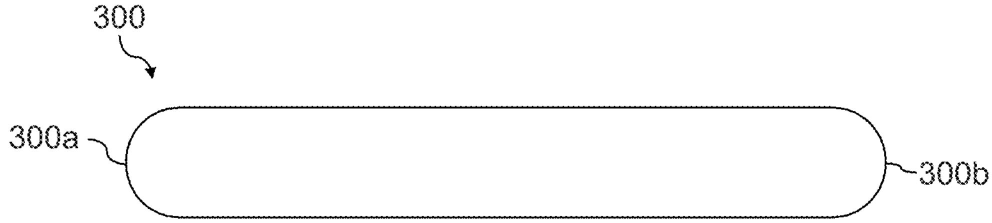
FIG. 6A illustrates a schematic, top-down view of one exemplary embodiment of a surface feature in accordance with aspects of the present subject matter, particularly illustrating the surface feature defining a non-airfoil shape between its forward and aft ends.
Figure 6B:
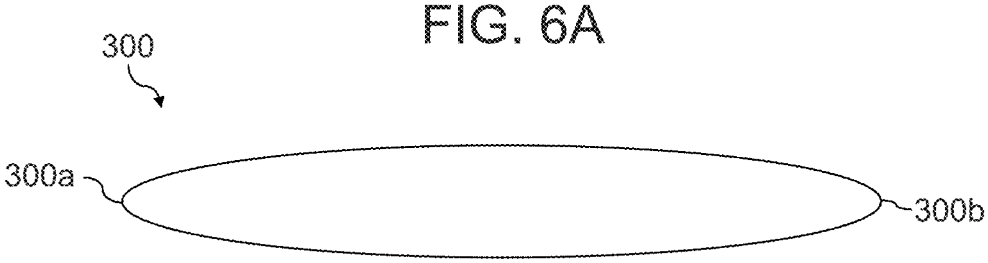
FIG. 6B illustrates a schematic, top-down view of another exemplary embodiment of a surface feature in accordance with aspects of the present subject matter, particularly illustrating the surface feature defining a non-airfoil shape between its forward and aft ends.
Figure 6C:
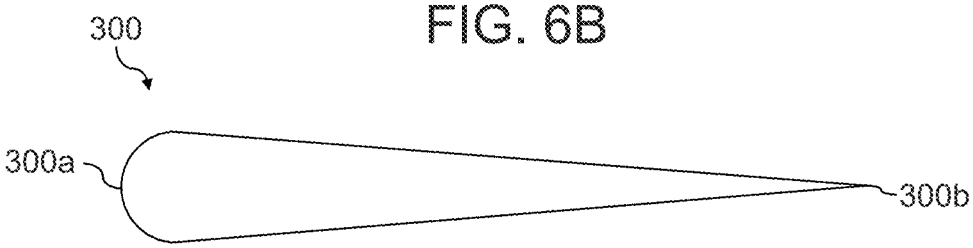
FIG. 6C illustrates a schematic, top-down view of a further exemplary embodiment of a surface feature in accordance with aspects of the present subject matter, particularly illustrating the surface feature defining a non-airfoil shape between its forward and aft ends.

Referring now to FIGS. 6A-6E, various schematic, top-down views of differing embodiments of exemplary surface features 300 are illustrated in accordance with aspects of the present subject matter, particularly illustrating various exemplary shapes that can be used for the surface features 300. Specifically, FIGS. 6A-6C illustrate surface features 300 have non-airfoil shapes defined in the lengthwise direction between their upstream and downstream ends 300*a*, 300*b*. For example, in the embodiment of FIG. 6A, the illustrated surface feature 300 defines a "rounded-end" oblong shape, with the upstream and downstream ends 300*a*, 300*b* being rounded-off to provide an aerodynamic shape that minimizes sharp disruptions in the airflow. In the embodiment of FIG. 6B, the surface feature 300 is shown as defining an oval or elliptical shape between its upstream and downstream ends 300*a*, 300 to provide contoured or curved surfaces along the sides of the surface feature 300. In the embodiment of FIG. 6C, the illustrated surface feature 300 defines a cone or conical shape, with the upstream end 300*a* of the surface feature 300 being rounded off (e.g., similar to the upstream end 300*a* shown in FIG. 6A) and the surface feature 300 tapering in width as its extends from its rounded upstream end 300*a* to its downstream end 300*b* such that the surface feature terminates at a discrete edge at the downstream end 300*b*. In other embodiments, it should be appreciated that various other non-airfoil shapes and/or profiles may also be utilized with the disclosed surface features 300.

Figure 6D:
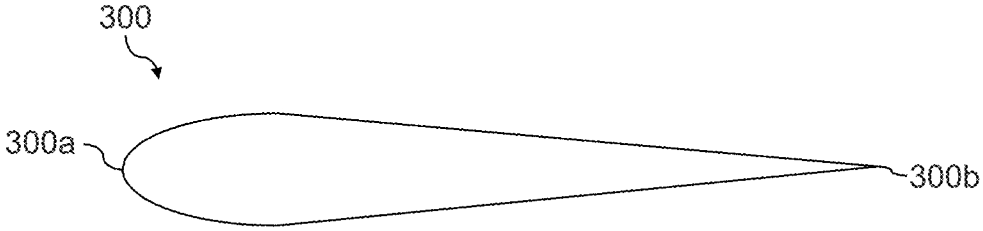
FIG. 6D illustrates a schematic, top-down view of yet another exemplary embodiment of a surface feature in accordance with aspects of the present subject matter, particularly illustrating the surface feature defining an airfoil shape between its forward and aft ends.
Figure 6E:
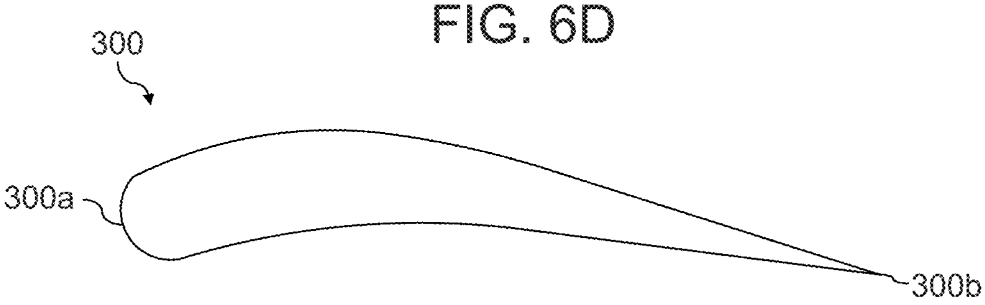
FIG. 6E illustrates a schematic, top-down view of a further exemplary embodiment of a surface feature in accordance with aspects of the present subject matter, particularly illustrating the surface feature defining an airfoil shape between its forward and aft ends.

Additionally, unlike the embodiments described above with reference to FIGS. 6A-6C, the illustrated surface features 300 of FIGS. 6D and 6E define or include airfoil shapes. Specifically, the illustrated surface feature 300 of FIG. 6D defines a symmetrical airfoil shape between its upstream and downstream ends 300*a*, 300*b* such that the "pressure" and "suction" sides of the airfoil are mirrored or symmetrical. In contrast, the illustrated surface feature 300 of FIG. 6E defines a non-symmetrical or cambered airfoil shape between its upstream and downstream ends 300*a*, 300*b* such that the "pressure" and "suction" sides of the airfoil are not mirrored or are otherwise asymmetrical. In other embodiments, it should be appreciated that various other airfoil shapes and/or profiles may also be utilized with the disclosed surface features 300.

Additionally, it should be appreciated that the various arrangements, lengths, heightwise profiles, and shapes shown in FIGS. 4A-4C, FIGS. 5A-5D, and FIGS. 6A-6E can be used in combination in any suitable manner. For instance, a surface feature 300 having one of the shapes shown in FIGS. 6A-6E may have any suitable heightwise profile (including any of the heightwise profiles shown in FIGS. 5A-5D) and/or may be arranged relative to other surface features 300 in any suitable manner (including any of the arrangements shown in FIGS. 4A-4C). It should also be appreciated that, although the various alternative lengths, heightwise profiles, and shapes have been described above with reference to the body-based surface features 300 that extend outwardly from the outer surface 116 of the aircraft body 110, such various alternative lengths, heightwise profiles, and shapes may also be advantageously utilized with the nacelle-based surface features 302, such as those that will be described below with reference to FIGS. 7 and 10.

Figure 7:
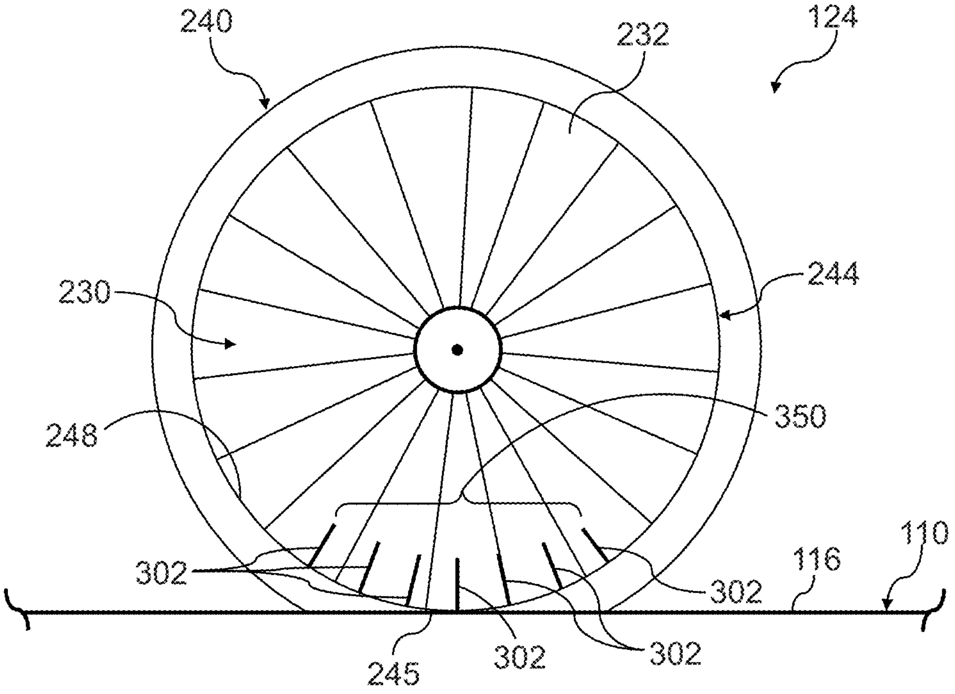
FIG. 7 illustrates a schematic, aft-looking view of the nacelle inlet of one of the engines of the aircraft shown in FIG. 1 in accordance with aspects of the present subject matter, particularly illustrating a bottom end of the nacelle inlet being positioned substantially flush relative to an adjacent outer surface of the blended wing body and a plurality of surface features being provided within the nacelle upstream of the fan.

Referring now to FIG. 7, a schematic, aft-looking view of the nacelle inlet 244 of one of the engines (e.g., the first engine 124) of the aircraft 100 shown in FIG. 1 is illustrated in accordance with aspects of the present subject matter, particularly illustrating a plurality of nacelle-based surface features 302 positioned within the nacelle 240 of the engine 124. For example, in the illustrated embodiment, the surface features 302 are generally configured to project or extend radially outwardly from the inner surface 248 of the nacelle 240 such that the surface features 302 interact with the boundary layer air being ingested by the engine 124. As indicated above with reference to FIG. 2, such nacelle-based surface features 302 may, for instance, be positioned within the nacelle 240 downstream of the nacelle inlet 244 and upstream of the fan 230.

As shown in FIG. 7, similar to the embodiment illustrated in FIG. 2, the engine 124 is depicted as being supported relative to the aircraft body 110 such that the engine 124 is configured to ingest the flow of boundary layer air flowing across the body's outer surface 116. Specifically, in the illustrated embodiment, the bottom end 245 of the nacelle inlet 244 is positioned substantially flush with the adjacent outer surface 116 of the body 110, allowing boundary layer air to flow into the nacelle inlet 244. In this regard, to condition the incoming air in a manner that prevents stall-related conditions and/or any other undesirable operating conditions (e.g., by straightening and directing the airflow towards the fan blades 232), the nacelle-based surface features 302 may be positioned within the nacelle 240 upstream of the fan 230. Such nacelle-based surface features 302 may be use in addition to the body-based surface features 300 described above or may be used as an alternative to such body-based surface features 300.

As shown in FIG. 7, the surface features 302 are generally arranged in an arced array 350 around the inner perimeter of the nacelle 240. Specifically, in the illustrated embodiment, the arced array 350 of surface features 302 is generally centered at the bottom end 245 of the nacelle inlet 244 and extends circumferentially from such central location along the inner perimeter of the nacelle 240. In this regard, the arc length of the arced array 350 (e.g., the extent to which the array 350 extends around the inner perimeter of the nacelle 240 from the bottom end 245) may generally be selected based on the area of the nacelle inlet 244 across which boundary layer ingestion is occurring. Similarly, the circumferential spacing between adjacent surface features 302, along with the heights, lengths, and/or shapes of such features 302, may generally be selected to optimize or enhance the interaction between the boundary layer air and the surface features 302, which reduces the likelihood of flow separation and the associated risks of engine stall or surge.

It should be appreciated that, due to the placement of the surface features 302, such features 302 may be configured to function as inlet guide vanes for the engine. For instance, the surface features 302 may be configured as static or fixed inlet guide vanes or as variable inlet guide vanes. When configured to function as variable inlet guide vanes, it should be appreciated that the orientation and/or position of the surface features 302 may be adjustable (e.g., based on real-time performance data or any other suitable data, including data from one or more sensors provided in association with the surface features 302), to allow for enhanced adaptability of the propulsion system. Although not described above, it should be appreciated that the body-based surface features 300 may also be configured as variable or adjustable fins/vanes to allow their position and/or orientation to be adjusted as desired.

Figure 8:
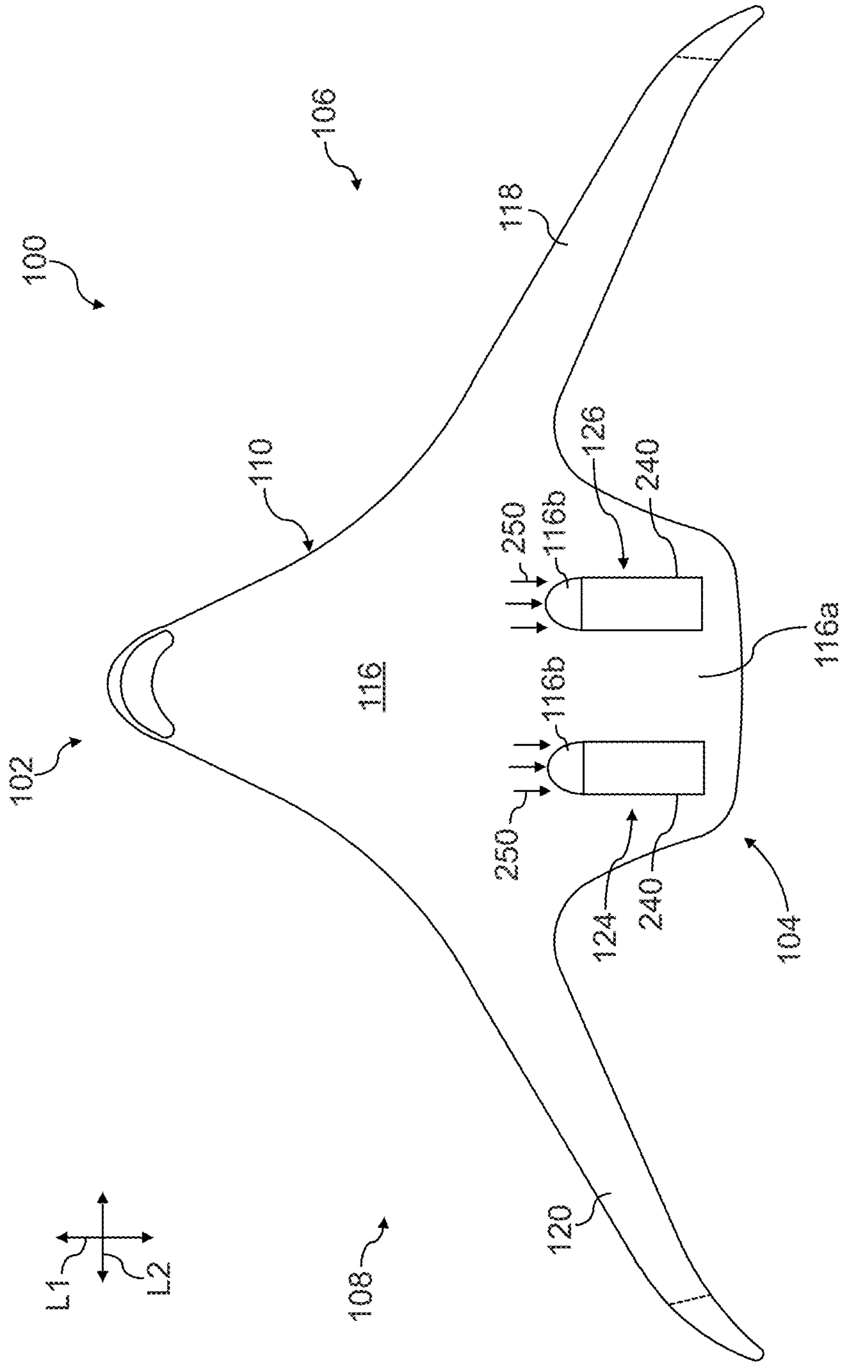
FIG. 8 illustrates a schematic, top down view of another embodiment of the aircraft shown in FIG. 1 in accordance with aspects of the present subject matter, particularly illustrating the blended wing body including a recessed inlet channel immediately upstream of each engine such that the outer surface of the body includes a recessed inlet surface immediately upstream of the engine that is recessed relative to a base profile surface of the body.
Figure 9:
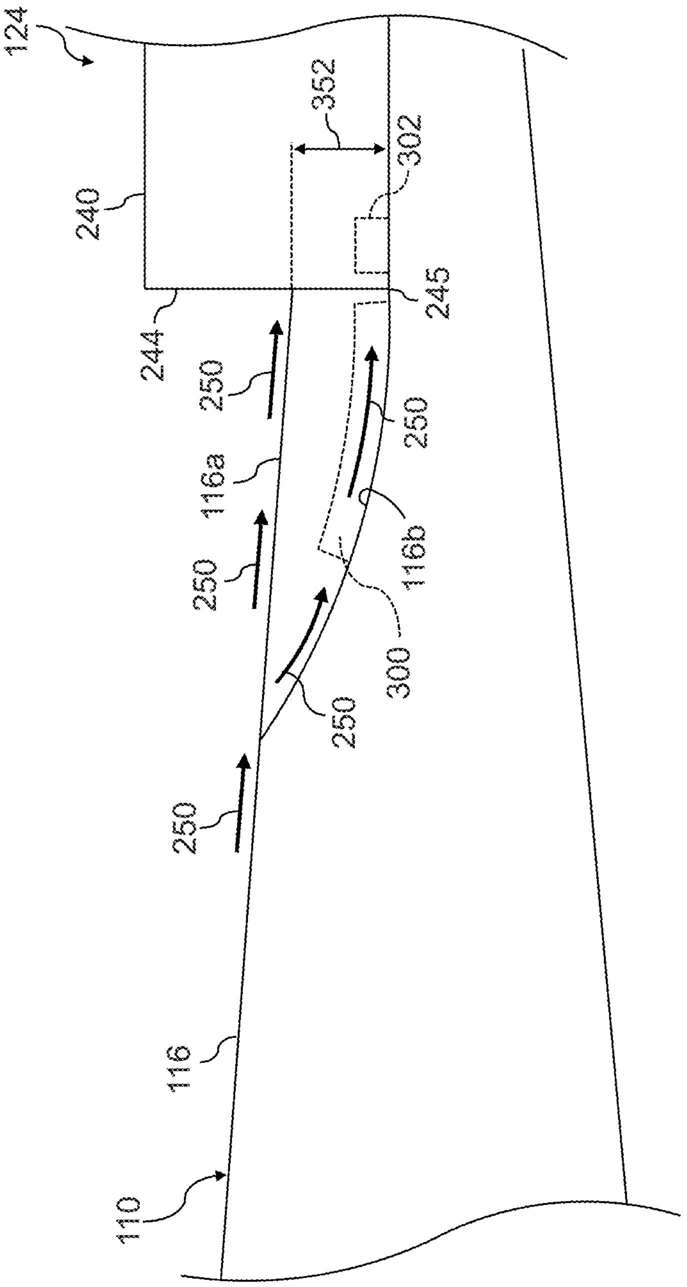
FIG. 9 illustrates a schematic, side profile view of a portion of the aircraft shown in FIG. 8, particularly illustrating exemplary locations for surface features relative to the recessed inlet channel defined in the body upstream of the nacelle inlet in accordance with aspects of the present subject matter.

Referring now to FIGS. 8 and 9, a variation of the embodiment of the aircraft 100 described above is illustrated in accordance with aspects of the present subject matter, particularly illustrating the aircraft 100 having a recessed engine configuration. Specifically, FIG. 8 illustrates a schematic, top view of one embodiment of the aircraft 100 in which the body 110 includes a recessed inlet channel immediately upstream of each engine 124, 126. Additionally, FIG. 9 illustrates a schematic, side profile view of a portion of the aircraft 100 shown in FIG. 8, particularly illustrating exemplary locations for positioning surface features relative to the recessed inlet channel defined in the body 110 of the aircraft 100.

As shown in FIGS. 8 and 9, the outer surface 116 of the aircraft body 110 includes a normal or base profile surface **116*a* generally defining the outer profile or shape of the body 110 and a recessed inlet surface 116*b* immediately upstream of each engine 124, 126 that is recessed relative to the base profile surface 116*a*. Such a configuration may be used when it is desirable to at least partially recess each engine 124, 126 relative to the base profile surface 116*a* of the body 110. For instance, as shown in FIG. 9, the bottom end 245 of the nacelle inlet 244 is recessed relative to base profile surface 116*a* by a given height differential 352. In this regard, each recessed inlet surface 116*b* may generally define an inlet channel upstream of the adjacent recessed engine 124, 126 through which a portion of the engine intake air flows. For instance, as shown in FIG. 9, the recessed inlet surface 116*b* generally begins at a location upstream of the respective engine 124 and defines a recessed profile (relative to the base profile surface 116*a*) from such upstream location to the nacelle inlet 244, with the bottom of the resulting inlet channel being generally flush with the bottom end 245 of the inlet 244. As a result, boundary layer air 250 may flow into and through the recessed inlet channel formed by the inlet surface 116*b* prior to being ingested by the recessed engine 124, 126**.

Similar to the embodiments described above, to reduce or eliminate the issues associated with such boundary layer ingestion, one or more surface features may be positioned relative to the nacelle inlet 244 to interact with the boundary layer air. For instance, as shown in FIG. 9, one or more body-based surface features 300 (indicated by dashed lines) may be positioned within the recessed inlet channel such that the surface features 300 extend outwardly form the recessed inlet surface **116*b*** and interact with the boundary layer air flowing through the channel. Additionally (or alternatively), one or more nacelle-based surface features 302 (indicated by dashed lines) may be positioned within the nacelle 240 at a location downstream of the nacelle inlet 244 (but upstream of the associated fan 230) to interact with the boundary layer air being ingested through the nacelle inlet 244.

Figure 10:
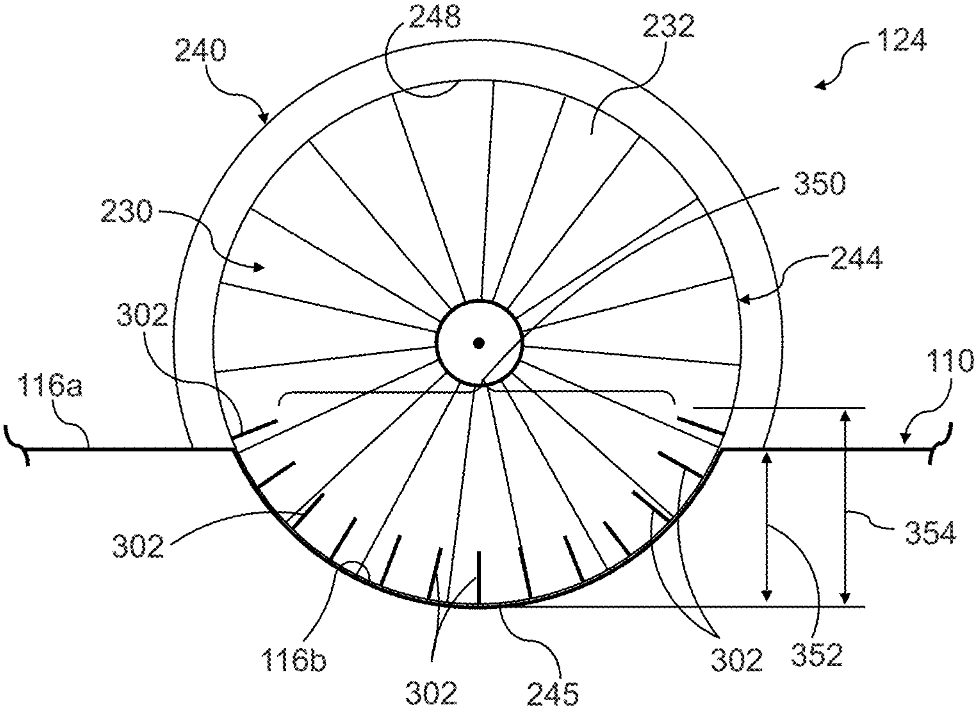
FIG. 10 illustrates a schematic, aft-looking view of the nacelle inlet of one of the engines of the aircraft shown in FIGS. 8 and 9, particularly illustrating one embodiment of a plurality of surface features being provided within the nacelle upstream of the fan assembly in accordance with aspects of the present subject matter.

Referring now to FIG. 10, a schematic, aft-looking view of the nacelle inlet 244 of one of the engines (e.g., engine 124) of the aircraft 100 shown in FIGS. 8 and 9 is illustrated in accordance with aspects of the present subject matter, particularly illustrating a plurality of nacelle-based surface features 302 positioned within the nacelle 240 of the engine 124. Similar to the embodiment described above with reference to FIG. 7, the surface features 302 are generally configured to project or extend radially outwardly from the inner surface 248 of the nacelle 240 such that the surface features 302 interact with the boundary layer air being ingested by the engine 124. Additionally, similar to the embodiment described above with reference to FIG. 7, the surface features 302 are generally arranged in an arced array 350 around the inner perimeter of the nacelle 240, with the arced array 350 of surface features 302 being centered at the bottom end 245 of the nacelle inlet 244 and extending circumferentially from such central location along the inner perimeter of the nacelle 240. With such a configuration (particularly the recessed engine arrangement), it is generally desirable that the arc length of the arced array 350 (e.g., the extent to which the array 350 extends around the inner perimeter of the nacelle 240 from the bottom end 245) be selected such that array 350 extends along the inner perimeter to a location above or beyond the adjacent base profile surface 116*a* of the aircraft body 110. Specifically, it may be desirable that the arced array 350 define an array height 354 relative to the bottom end 245 of the nacelle inlet 244 that is greater than the height differential 352 defined between the bottom end 245 of the nacelle inlet 244 and the base profile surface 116*a*. As a result, the surface features 302 may generally be positioned along the portion of the inner perimeter of the nacelle 240 at which boundary layer ingestion is occurring to allow the surface features 302 to interact with or precondition (e.g., straighten) the boundary layer air flowing into the engine 124.

It should be appreciated that, in several embodiments, one or more sensors, such one or more pressure sensors and/or one or more temperature sensors, may be provided in association with one or more of the surface features described herein, such as one or more of the body-based surface features 300 and/or one or more of the nacelle-based surface features 302. Such sensors may be configured to monitor the inbound operating conditions for the engines 124, 126 (including operating conditions associated with the boundary layer air 250) to provide data that that can be used to adjust the operation of the engines 124, 126 and/or the configuration of the surface features. For instance, the operation of the engines 124, 126 may be dynamically controlled based on data received from the sensors to allow for adaptive engine control that takes into account varying flight conditions and/or changes in the boundary layer characteristics. Additionally (or alternatively), the orientation and/or position of one or more of the surface features 300, 302 (e.g., the orientation and/or position of the surface features 300, 302 relative to the incoming flow of boundary layer air 250) may be adjusted based on the data received from the sensors.

Figure 11:
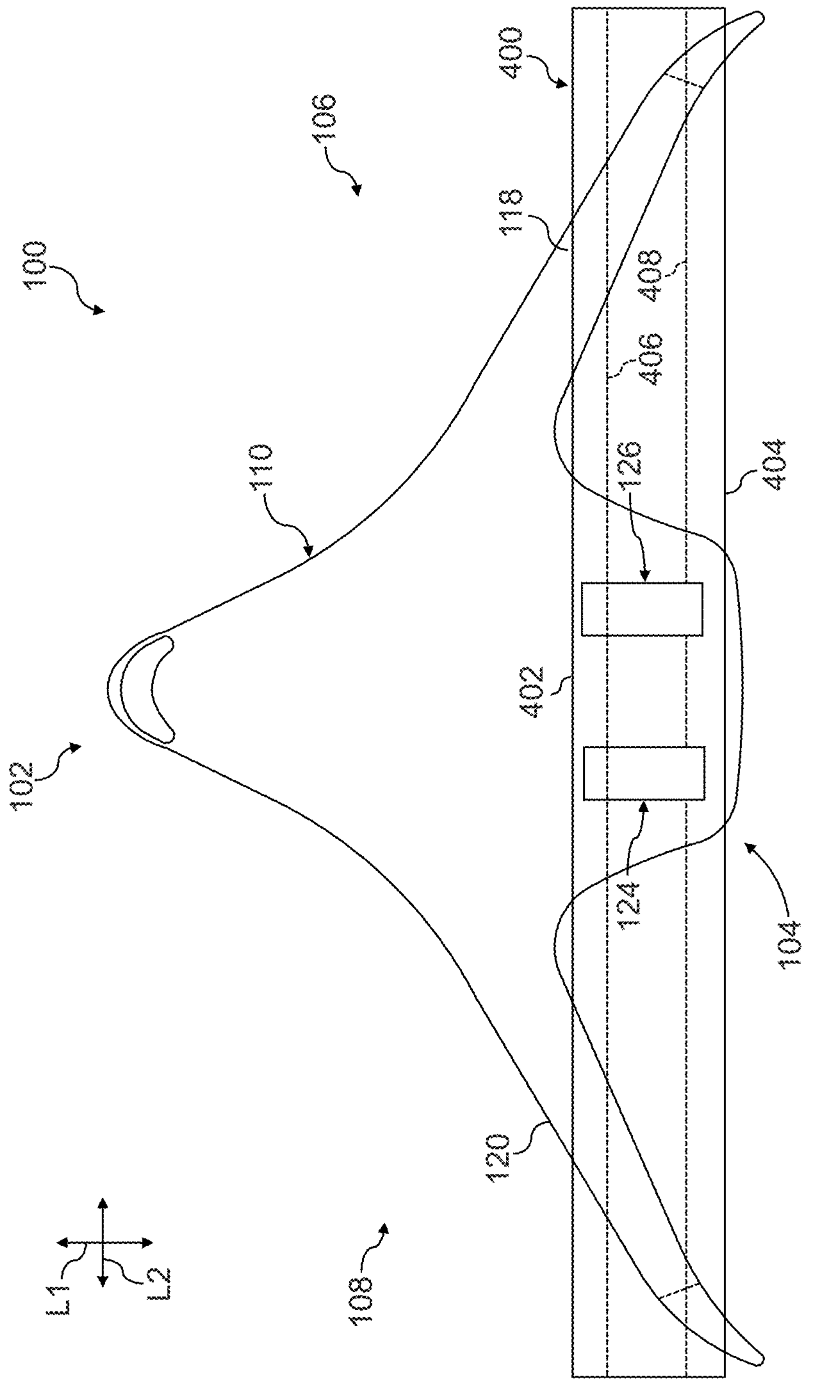
FIG. 11 illustrates a schematic, top-down view of the aircraft shown in FIG. 1, particularly illustrating one exemplary embodiment of a shielded section for the aircraft in accordance with aspects of the present subject matter.

Referring now to FIG. 11, a schematic, top-down view of the aircraft 100 shown in FIG. 1 is illustrated, particularly illustrating the aircraft 100 including a shielded section 400 in accordance with aspects of the present subject matter. In general, the shielded section 400 of the aircraft 100 is designed to include one or more shielding-related features (e.g., one or more shielding panels) to protect components of the aircraft 100 from damage during certain events, such as engine failures resulting in debris from rotary components being expelled or thrown from the engine(s).

As shown in FIG. 11, in one embodiment, the shielded section 400 may be configured to extend in the longitudinal direction L1 of the aircraft 199 between a forward shield end 402 and an aft shield end 404. In general, the position of the forward shield end 402 of the shielded section 400 may be selected to be aligned with or positioned forward of the location of the forwardmost rotating airfoils of the engines 124, 126 (with such location being indicated by dashed line 406 in FIG. 11). For instance, with the engine configuration described above with reference to FIG. 2, the forwardmost rotating airfoils of the engines 124, 126 may correspond to the fan blades 232 and, thus, the position of the forward shield end 402 of the shielded section 400 may be selected to be aligned with or positioned forward of the fan assemblies 204 of the engines 124, 126. In the illustrated embodiment, the forward shield end 402 of the shielded section 400 is positioned forward of the location 406 of the forwardmost rotating airfoils of the engines 124, 126 in the longitudinal direction L1. However, in other embodiments, the forward shield end 402 of the shielded section 400 may be aligned directly with the location 406 of the forwardmost rotating airfoils of the engines 124, 126 in the longitudinal direction L1.

Additionally, the position of the aft shield end 404 of the shielded section 400 may be selected to be aligned with or positioned aft of the location of the aftmost rotating airfoils of the engines 124, 126 (with such location being indicated by dashed line 408 in FIG. 11). For instance, with the engine configuration described above with reference to FIG. 2, the aftmost rotating airfoils of the engines 124, 126 may correspond to the rotating airfoils of the low pressure turbine 214 and, thus, the position of the aft shield end 404 of the shielded section 400 may be selected to be aligned with or positioned forward of the rotating airfoils of the low pressure turbine 214. In the illustrated embodiment of FIG. 11, the aft shield end 404 of the shielded section 400 is positioned aft of the location 408 of the aftmost rotating airfoils of the engines 124, 126 in the longitudinal direction L1. However, in other embodiments, the aft shield end 404 of the shielded section 400 may be aligned directly with the location 408 of the aftmost rotating airfoils of the engines 124, 126 in the longitudinal direction L1.

The shielded section 400 may also be configured to extend in the lateral direction L2 of the aircraft 100 any suitable distance along the lateral width of the aircraft 100. For instance, in the illustrated embodiment, the shielded section 400 is shown as incorporating both a section of the fuselage portion of the body 110 positioned adjacent to the engines 124, 126 and sections of the wings 118, 120 that are also aligned within the engines 124, 126. However, in other embodiments, the shielded section 400 may only extend laterally along the fuselage portion of the body 110 without extending to the wings 118, 120.

As will be described below, the shielded section 400 of the aircraft 100 may incorporate one or more shielding panels that extend across all or portions of the shielded section 400. In general, the shielding panels may be designed to function as armor for the aircraft 100 providing protection against impacts and debris, which safeguards critical aircraft components in the event of an engine failure or other catastrophic event. Thus, the shielding panels may be strategically placed along the shielded section 400 of the aircraft 100 to ensure desired damage protection.

Given their armor-providing function, it should be appreciated that the materials used for the shielding panels may, in several embodiments, be selected based on desired material properties, such as strength, impact-performance, weight, etc. In certain implementations, the panels may be formed from one or more metal materials, such as aluminum-based materials, iron-based materials, nickel-based materials, and/or any other suitable metal materials. In other implementations, the shielding panels may be formed from one or more composite materials, such as Kevlar, carbon-fiber composite materials, and/or any other suitable composite materials.

Figure 12:
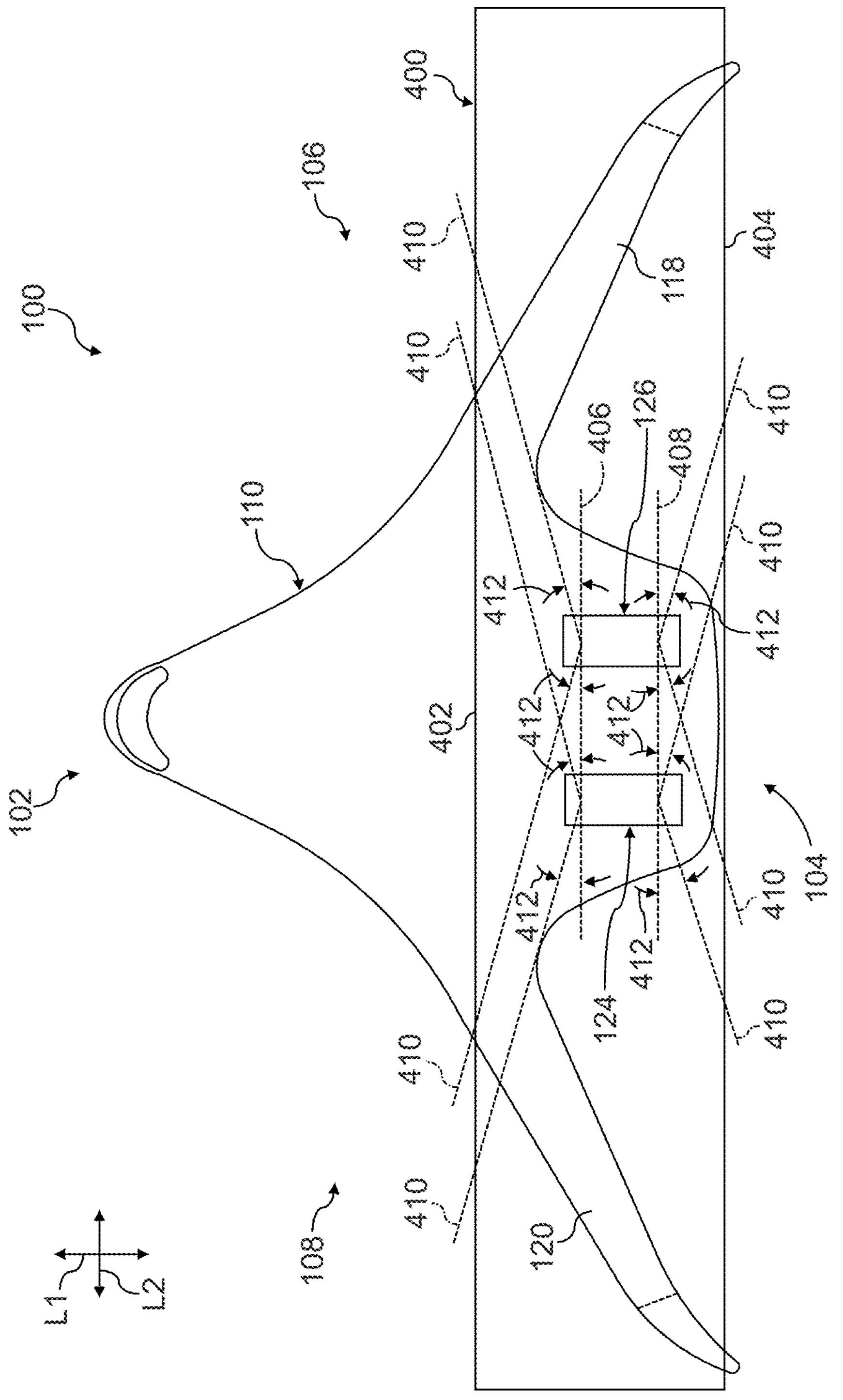
FIG. 12 illustrates a schematic, top-down view of the aircraft shown in FIG. 1, particularly illustrating another exemplary embodiment of a shielded section for the aircraft in accordance with aspects of the present subject matter.

Referring now to FIG. 12, another schematic, top-down view of the aircraft 100 shown in FIG. 11 is illustrated, particularly illustrating a different method for selecting the longitudinal positioning of the forward and aft shield ends 402, 404 of the shielded section 400 of the aircraft 100. Specifically, in the illustrated embodiment, the positioning of the forward and aft shield ends 402, 404 of the shielded section 400 has been selected by taking into account the potential trajectories for debris being expelled or thrown from the engines 124, 126. For example, in the event of component failure within an engine 124, 126, it may be possible for debris to be expelled at a given "throw angle" forward and/or aft of the location of the rotating component of the engine 124, 126. Thus, as shown in FIG. 12, "throw lines" (indicated by dashed lines 410) have been provided that extend outwardly from the locations 406, 408 of the forwardmost and aftmost rotating airfoils of the engines 124, 126 at a throw angle 412 relative to the lateral direction L2 corresponding to the maximum anticipated trajectory angle for debris expelled from the engines 124, 126. For instance, the throw angle 412 may, in one embodiment, range from greater than zero degrees to less than about 30 degrees, such as from about 5 degrees to about 25 degrees or from about 10 degrees to about 20 degrees or from about 14 degrees to about 16 degrees and/or any other subranges therebetween. In general, the throw angle 412 may vary based on the specific characteristics of the engines 124, 126 and/or the anticipated or potential types of failures.

As shown in FIG. 12, the positioning of the forward and aft shield ends 402, 404 of the shielded section 400 may be selected based on the potential throw lines 410 for the engines 124, 126. For instance, the forward shield end 402 of the shielded section 400 has been positioned so as to be aligned with the forwardmost location at which the throw lines 410 intersect with the body 110 of the aircraft 100. Similarly, the aft shield end 404 of the shielded section 400 has been positioned aft or rearward of the aftmost location at which the throw lines 410 intersect with the fuselage position of the body 110, such as by having the shielded section 400 extend all the way to the aft end 104 of the aircraft 100. However, in other embodiments, the positioning of the forward and aft shield ends 402, 404 of the shielded section 400 may be selected based on the potential throw lines 410 in any other suitable manner.

Figure 13:
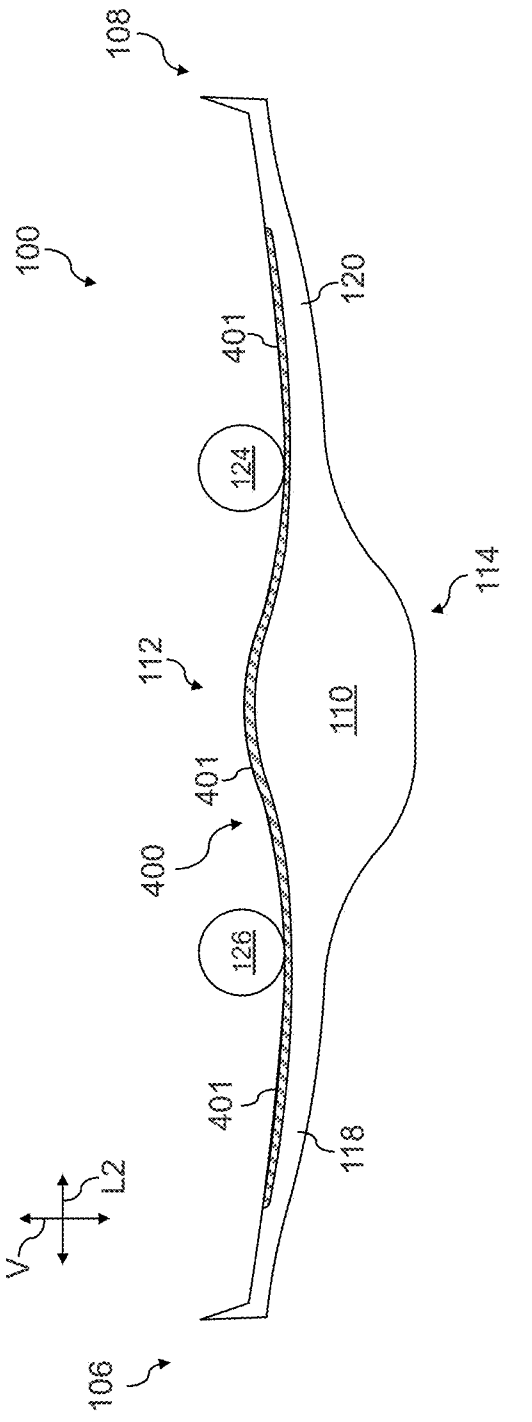
FIG. 13 illustrates a schematic, front view of the aircraft shown in FIG. 11 or FIG. 12, particularly illustrating the shielded section being provided along the top side of the aircraft in accordance with aspects of the present subject matter.
Figure 14:
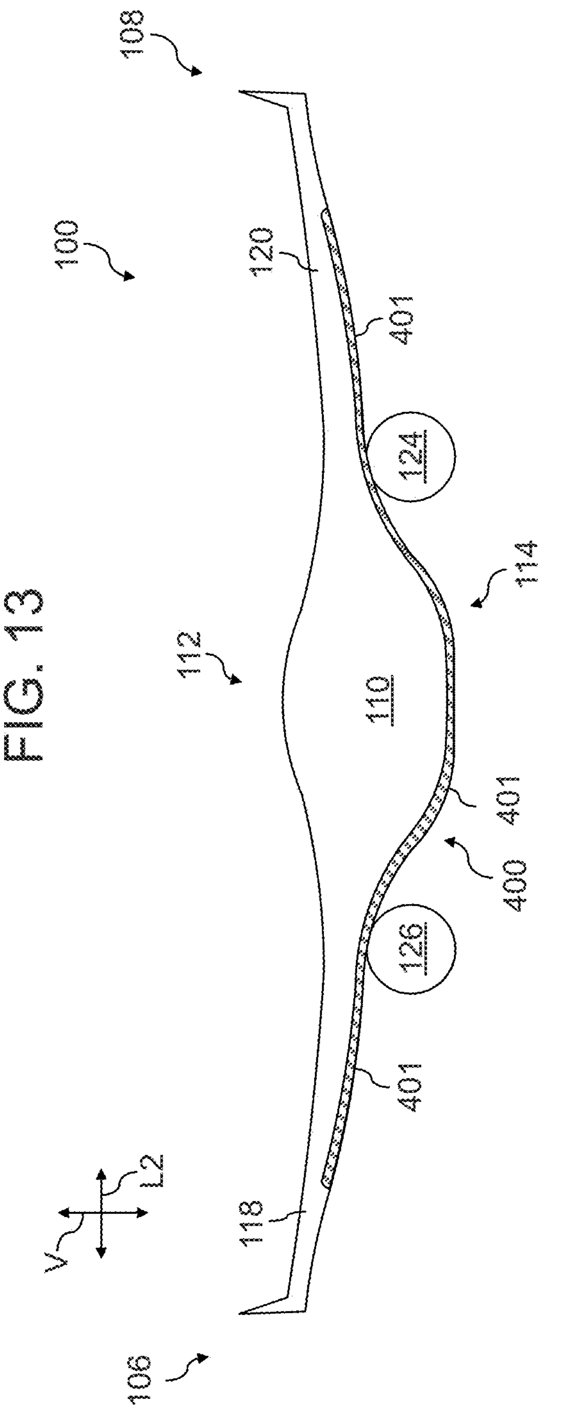
FIG. 14 illustrates a schematic, front view of another embodiment of the aircraft shown in FIG. 1, particularly illustrating the shielded section being provided along the bottom side of the aircraft when the aircraft is a bottom-side engine configuration in accordance with aspects of the present subject matter.

Referring now to FIG. 13, a schematic front view of the aircraft 100 shown in FIG. 11 or FIG. 12 is illustrated, particularly illustrating one or more shielding panels 401 provided along the shielded section 400 of the aircraft 100. In several embodiments, the shielded section 400 (and, thus, the shielding panels 401) may be provided along the engine-side of the aircraft 100 to allow the panels 401 to function as armor to protect body-based components of the aircraft 100 during an engine failure. For instance, in the embodiment shown in FIG. 13, the aircraft 100 has a top-side engine mounting arrangement. As such, the shielded section 400 may be similarly positioned on the aircraft 100 with one or more shielding panels 401 extending across the top side 112 of the aircraft 100. Alternatively, in embodiments in which the aircraft 100 has a bottom-side engine mounting arrangement, the shielded section 400 may be provided along the bottom side 114 of the aircraft 100. For example, FIG. 14 illustrates an alternative embodiment of the aircraft 100 shown in FIG. 13 in which the engines 124, 126 are mounted along the bottom side 114 of the aircraft 100. In such an embodiment, the shielded section 400 and associated shielding panels 401 may be provided along the same side to provide the desired damage protection for any of the body-based components aligned with the shielded section 400.

As shown in both FIGS. 13 and 14, one or more shielding panels 401 may be positioned within the portion of the shielded section 400 extending in the lateral direction L2 directly between the engines 124, 126 to shield such portion of the aircraft body 110 from debris that may be thrown inwardly towards the centerline of the aircraft 100 (or in the direction of the other engine). Additionally, as shown in FIGS. 13 and 14, one or more shielding panels 401 may be positioned within the portion of the shielded section 400 extending in the lateral direction L2 outwardly from the engines 124, 126 towards the wings 118, 120 to shield such portion of the aircraft body 110 from debris that may be thrown outwardly away from centerline of the aircraft 100 (or away from the other engine).

It should be appreciated that the shielding panels 401 may be integrated or incorporated into the aircraft body 110 in any suitable manner. For instance, in the illustrated embodiment, the shielding panels 401 are integrated into the body 110 such that the outer surface(s) of the panel(s) 401 form the outer surface 116 (FIG. 1) of the aircraft 100. In such an embodiment, the outer surface of each panel 401 may define a portion of the aerodynamic profile of the aircraft body 110 in addition to being configured as a structural or armor-based component of the aircraft 100. Alternatively, the shielding panels 401 may be positioned underneath the outer surface 116 (FIG. 1) of the aircraft 100. Additionally, as indicated above, it should be appreciated that the materials used for the shielding panels 401 can vary, including options such as advanced composites or metals, which can provide high strength-to-weight ratios and excellent impact resistance.

Figure 15:
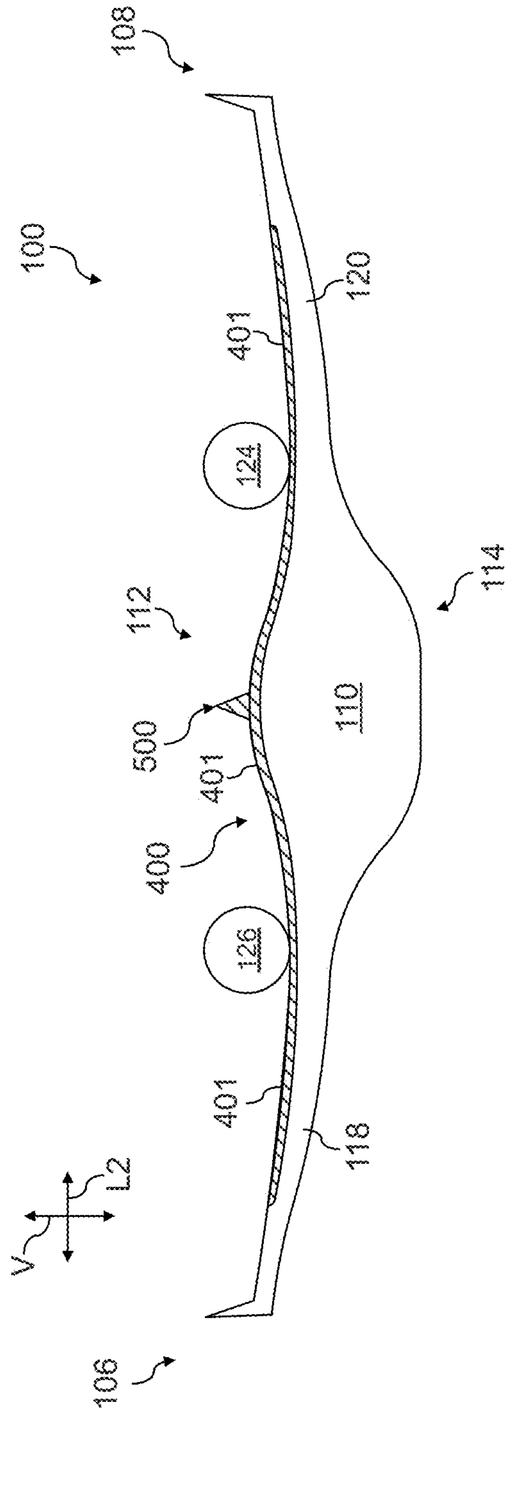
FIG. 15 illustrates a schematic, front view of another embodiment of the aircraft shown in FIG. 13, particularly illustrating the aircraft further including a shielding tail provided between the engines of the aircraft in accordance with aspects of the present subject matter.

Referring now to FIG. 15, a schematic front view of an alternative embodiment of the aircraft 100 shown in FIG. 13 is illustrated in accordance with aspects of the present subject matter, particularly illustrating the aircraft 100 including additional shielding-related features. Specifically, in the illustrated embodiment of FIG. 15, the aircraft 100 is shown with the integration of a shielding tail 500 positioned between the first and second engines 124, 126 to prevent cross-engine damage that may otherwise occur when debris from one engine is expelled or thrown towards the other engine. For instance, as will be described below, the shielding tail 500 may be configured to extend vertically outwardly from the aircraft body 110 to a given height to form a barrier between the engines 124, 126 to allow the tail 500 to block or shield each engine from cross-engine debris thrown laterally from the opposed engine.

As shown in FIG. 15, the shielding tail 500 is provided in combination with the shielding panel(s) 401 extending across the shielded section 400 to allow the panel(s) 401 to protect body-based components of the aircraft 100 while the tail 500 functions to prevent cross-engine damage. In such an embodiment, the shielding tail 500 may be formed integrally with one or more of the shielding panels 401 or may be separately coupled to one or more of the shielding panels 401 and/or one or more other components of the aircraft 100. Alternatively, in one embodiment, the shielding tail 500 may be incorporated into the aircraft 100 without the additional integration of shielding panels 401.

It should be appreciated that, in several embodiments, the shielding tail 500 may be formed from the same or similar materials as those described above with reference to the shielding panel(s) 401. For instance, in certain implementations, the shielding tail 500 may be formed from one or more metal materials, such as aluminum-based materials, iron-based materials, nickel-based materials, and/or any other suitable metal materials. In other implementations, the shielding tail 500 may be formed from one or more composite materials, such as Kevlar, carbon-fiber composite materials, and/or any other suitable composite materials.

Figure 16:
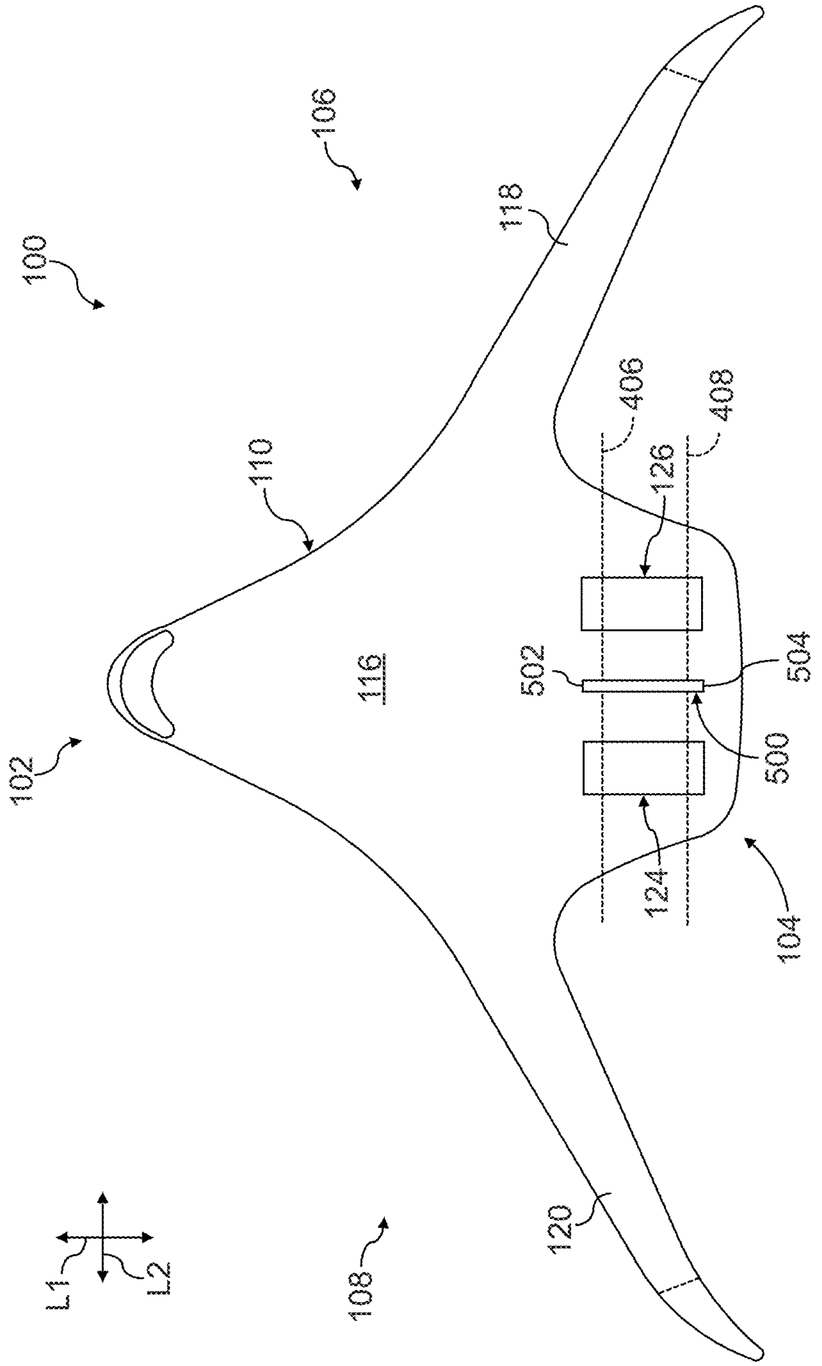
FIG. 16 illustrates a schematic, top-down view of the aircraft shown in FIG. 1, particularly illustrating the aircraft including one embodiment of a shielding tail between the engines of the aircraft in accordance with aspects of the present subject matter.
Figure 17:
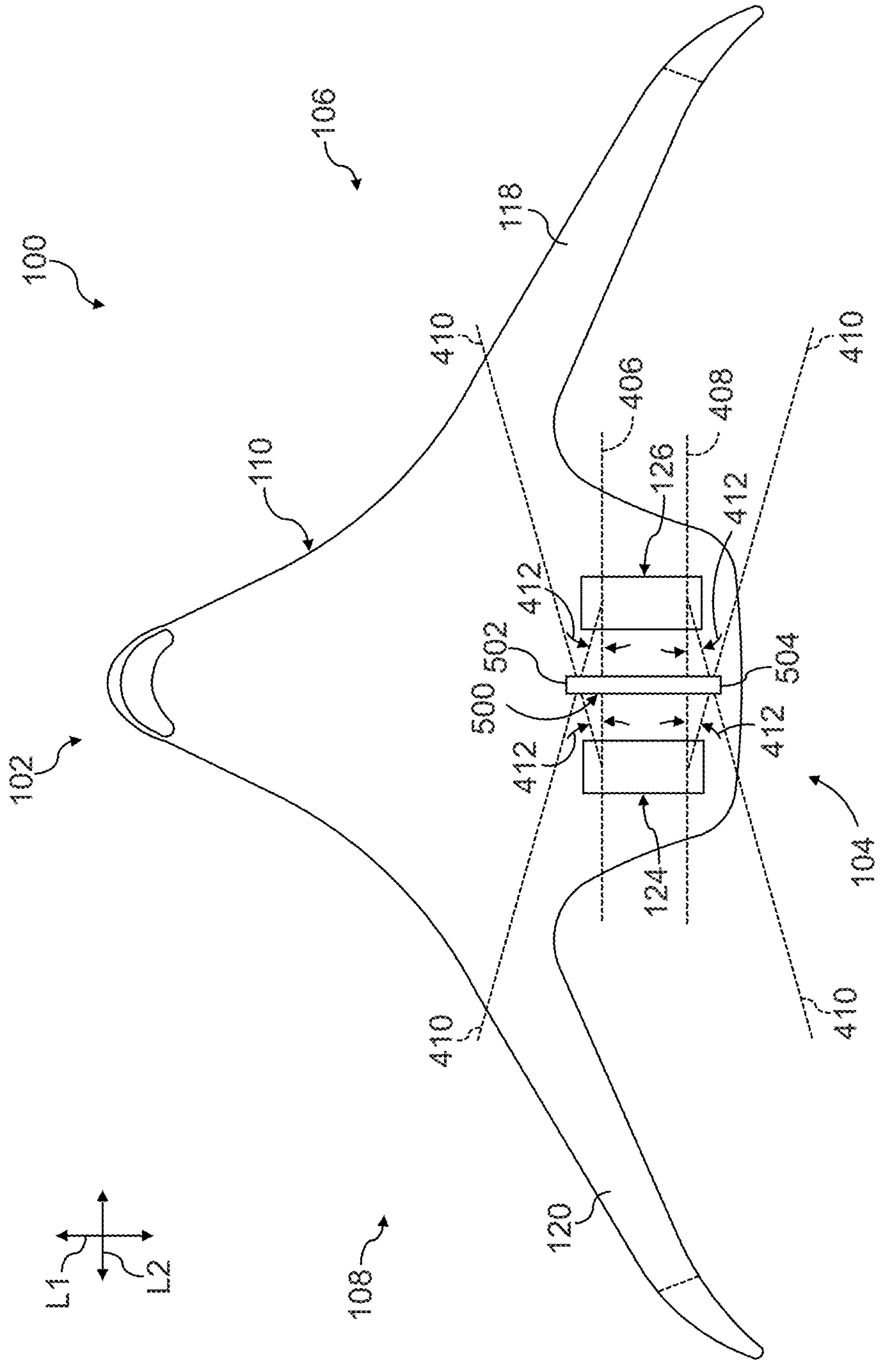
FIG. 17 illustrates a schematic, top-down view of the aircraft shown in FIG. 1, particularly illustrating the aircraft including another embodiment of a shielding tail between the engines of the aircraft in accordance with aspects of the present subject matter.

Referring now to FIGS. 16 and 17, schematic, top-down views of an exemplary aircraft 100 including a shielding tail 500 are illustrated in accordance with aspects of the present subject matter, particularly illustrating examples of the longitudinal positioning of the shielding tail 500 relative to the engines 124, 126. As shown in FIGS. 16 and 17, the shielding tail 500 is generally configured to extend longitudinally between a forward tail end 502 and an aft tail end 504. In several embodiments, the longitudinal positioning of the forward and aft tail ends 502, 504 may be selected based on the relative positioning of the rotating components of the engines 124, 124, such as the position of the forwardmost rotating airfoils of the engines 124, 126 (e.g., as indicated by dashed line 406) and/or the position of the aftmost rotating airfoils of the engine 124, 126 (e.g., as indicated by dashed line 408). As such, the shielding tail 500 may function to prevent cross-engine debris from being thrown or discharged from one engine to the other.

For example, as shown in FIG. 16, in one embodiment, the position of the forward tail end 502 of the shielding tail 500 may be selected based on the location 406 of the forwardmost rotating airfoils of the engines 124, 126. Specifically, in the illustrated embodiment, the forward tail end 502 of the shielding tail 500 is positioned forward of the location 406 of the forwardmost rotating airfoils of the engines 124, 126 in the longitudinal direction L1. However, in other embodiments, the forward tail end 502 of the shielding tail 500 may be aligned directly with the location 406 of the forwardmost rotating airfoils of the engines 124, 126 in the longitudinal direction L1. Additionally, in one embodiment, the position of the aft tail end 504 of the shielding tail 500 may be selected based on the location 408 of the aftmost rotating airfoils of the engines 124, 126. For instance, as shown in FIG. 16, the aft tail end 504 of the shielding tail 500 is positioned aft of the location 408 of the aftmost rotating airfoils of the engines 124, 126 in the longitudinal direction L1. However, in other embodiments, the aft tail end 504 of the shielded section 400 may be aligned directly with the location 408 of the aftmost rotating airfoils of the engines 124, 126 in the longitudinal direction L1.

Alternatively, as shown in FIG. 17, the positioning of the forward and aft tail ends 502, 504 of the shielding tail 500 may be selected by taking into account the potential trajectories for debris being expelled or thrown from the engines 124, 126. Specifically, similar to the embodiment described above with reference to FIG. 12, "throw lines" (indicated by dashed lines 410) may be defined that extend outwardly from the locations 406, 408 of the forwardmost and aftmost rotating airfoils of the engines 124, 126 at a throw angle 412 relative to the lateral direction L2 corresponding to the maximum anticipated trajectory angle for debris expelled from the engines 124, 126.

In such an embodiment, the position of the forward tail end 502 of the shielding tail 500 may be selected based on the positioning of the intersection of the throw lines 410 extending from the locations 406 of the forwardmost rotating airfoils of the engines 124, 126. Specifically, as shown in FIG. 17, the forward tail end 502 of the shielding tail 500 400 is positioned forward of the location of the intersection of the throw lines 410 extending from the forwardmost rotating airfoils of the engines 124, 126. However, in other embodiments, the forward tail end 502 of the shielding tail 500 may be aligned directly with the location of such intersection. Similarly, in one embodiment, the position of the aft tail end 504 of the shielding tail 500 may be selected based on the positioning of the intersection of the throw lines 410 extending from the location 408 of the aftmost rotating airfoils of the engines 124, 126. For instance, as shown in FIG. 17, the aft tail end 504 of the shielding tail 500 is positioned aft of the location of the intersection of the throw lines 410 extending from the aftmost rotating airfoils of the engines 124, 126. However, in other embodiments, the aft tail end 504 of the shielded section 400 may be aligned directly with the location of such intersection.

Figure 18:
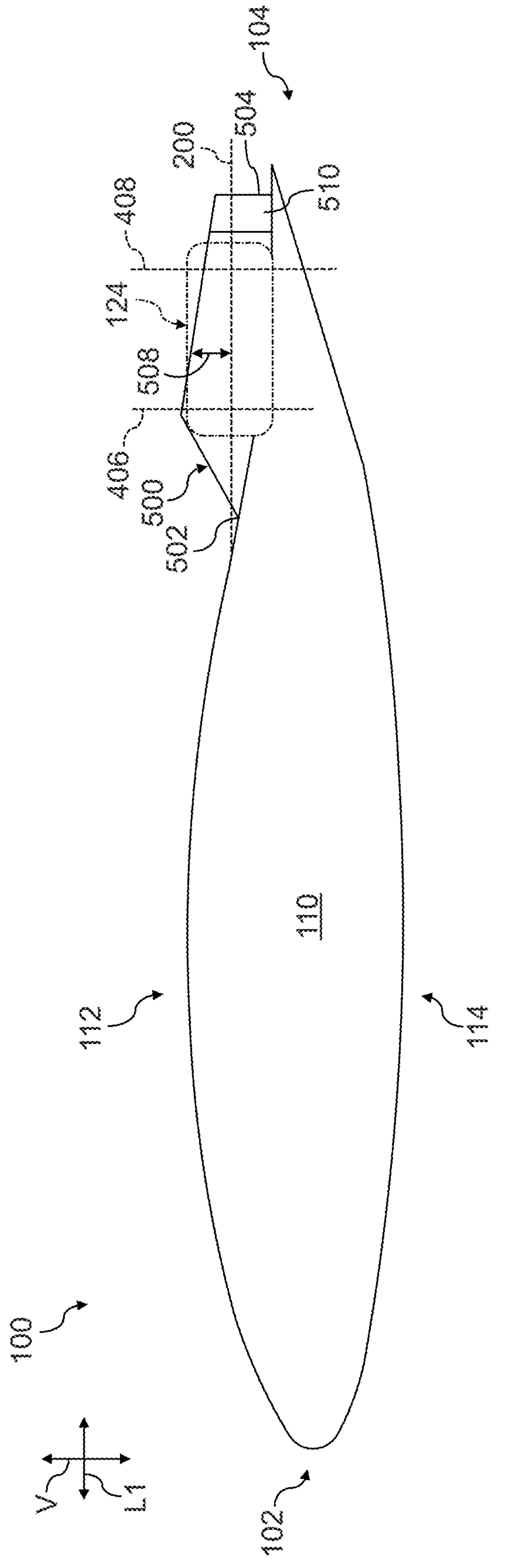
FIG. 18 illustrates a schematic, side-profile view of an aircraft including one embodiment of a shielding tail between the engines of the aircraft in accordance with aspects of the present subject matter.

Referring now to FIG. 18, a schematic, side-profile view of an exemplary aircraft 100 including a shielding tail 500 is illustrated in accordance with aspects of the present subject matter, particularly illustrating an exemplary height-wise or vertical profile of the tail 500 as it extends longitudinally between its forward and aft tail ends 502, 504. Specifically, as shown in FIG. 18, the shielding tail 500 defines a varying height 508 as it extends between its forward and aft tail ends 502, 504, with the height being referenced or defined relative to the centerlines 200 of the engines 124, 126 (only one of which is shown schematically in FIG. 18 using dash-dot lines). It should be appreciated that the height 508 may, instead, be referenced relative to any other suitable component or feature of the aircraft 100, such as the outer surface of the body 110 of the aircraft 100.

As shown in FIG. 18, the height 508 of the shielding tail 500 generally increases as it extends from its forward tail end 502 towards the location 406 of the forwardmost rotating airfoils of the engines 124, 126, with the tail 500 defining a maximum height 508 at or adjacent to such location 406 of the forwardmost rotating airfoils. Additionally, as shown in FIG. 18, the height 508 of the shielding tail 500 generally decreases as the tail 500 extends from the location of its maximum height past the location 408 of the aftmost rotating airfoils of the engines 124, 126 to the aft tail end 504 of the shielding tail 500. As will be described below with reference to FIGS. 19 and 20, the minimum required local height of the tail 500 at any given location along its longitudinal length (particularly its length between the locations 406, 408 of the forwardmost and aftmost rotating airfoils of the engines 124, 126) may, in one embodiment, be based on one or more engine-related dimensions and/or parameters, such as the size or radius of the rotating components of the engines 124, 126. For instance, with many engine configurations (such as the configuration shown in FIG. 2), the fan assembly 204, as the forwardmost rotating component of the engine 124, 126, defines the largest radial dimension of the engine's rotating components and, thus, the height 508 of the shielding tail 500 may be increased or maximized at the location 506 of such forwardmost rotating airfoils to ensure proper cross-engine protection, whereas the more-rearward-located rotating components of the engine 124 are typically smaller in radial dimension, which allows the height 508 of the shielding tail 500 to be tapered or reduced as its extends rearward towards its aft tail end 504. However, it should be appreciated that, in other embodiments, the shielding tail 500 may be configured to define any other suitable heightwise profile, including having one or more sections of uniform or constant height along its longitudinal length.

FIG. 18 also illustrates an embodiment of the shielding tail 500 that incorporates an optional control surface 510 at or adjacent to its aft tail end 504. Specifically, in the illustrated embodiment, the control surface 510 is configured as a vertically-oriented control surface to allow the control surface 510 to function as a rudder for the aircraft 100. As such, in addition to providing cross-engine shielding, the tail 500 may function to enhance the maneuverability and stability of the aircraft 100 by providing additional control capabilities. For instance, as generally understood, the control surface 510 may be actuatable or movable about a given pivot axis (e.g., a vertically oriented pivot axis) to allow the control surface 510 to be used to stabilize the aircraft 100 during flight.

Figure 19:
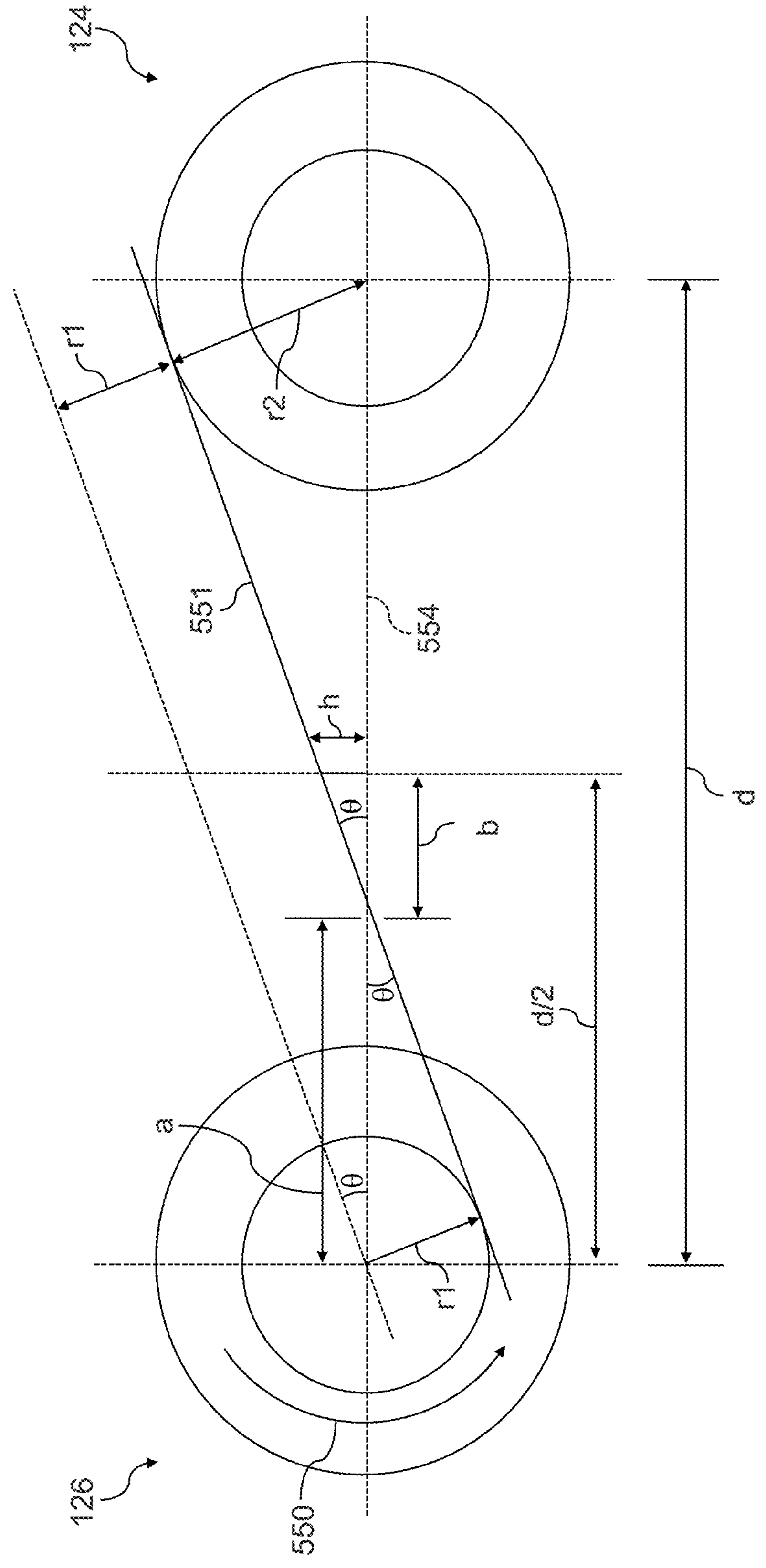
FIG. 19 illustrates a schematic, front view of first and second engines of a blended wing aircraft, particularly illustrating one example of a manner in which a minimum height can be calculated for a shielding tail in accordance with aspects of the present subject matter.
Figure 20:
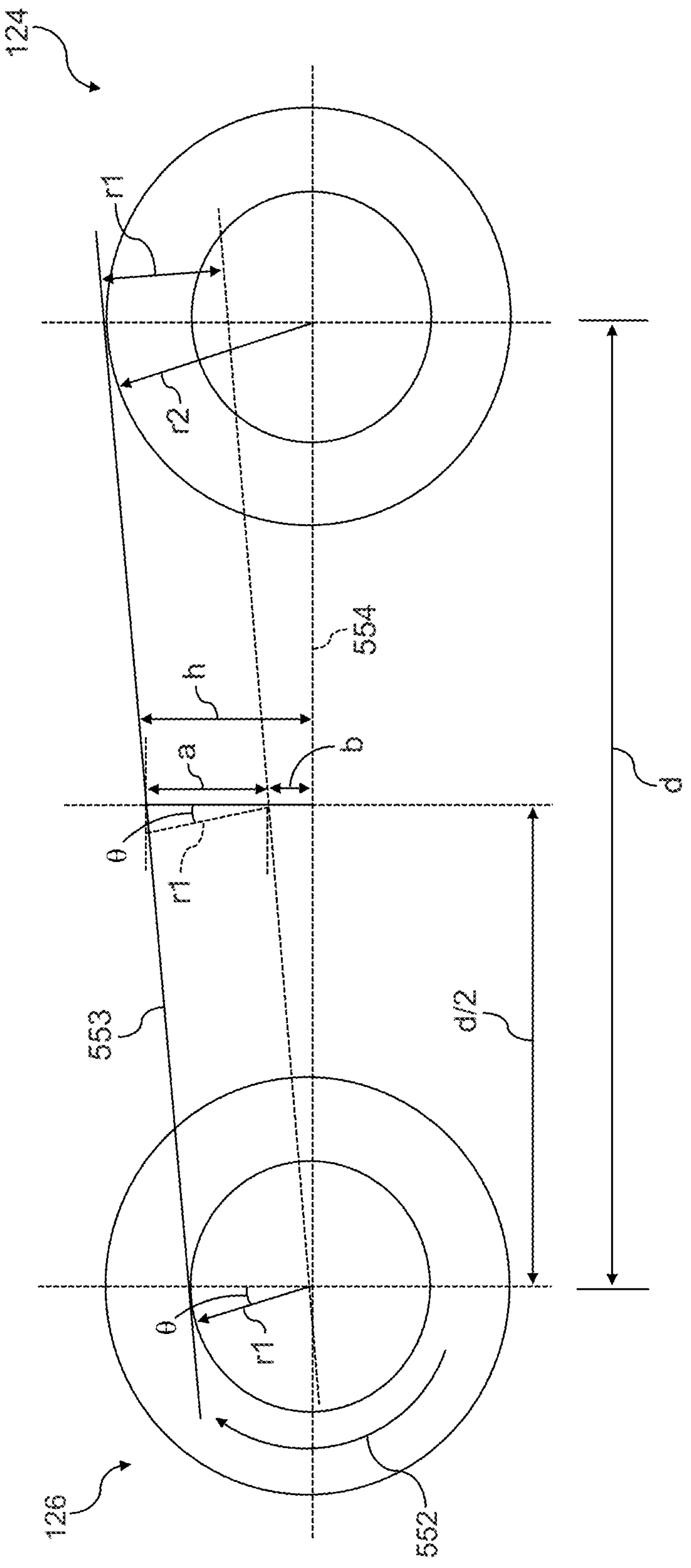
FIG. 20 illustrates a schematic, front view of first and second engines of a blended wing aircraft, particularly illustrating another example of a manner in which a minimum height can be calculated for a shielding tail in accordance with aspects of the present subject matter.

Referring now to FIGS. 19 and 20, schematic front views of the first and second engines 124, 126 of the aircraft 100 described above are illustrated in accordance with aspects of the present subject matter, particularly illustrating examples of the manner in which a local minimum height (h) (e.g., as defined relative to the engine centerlines) may be defined for a shielding tail 500 located between the engines 124, 126 to ensure that the tail 500 can block or shield the engines 124, 126 from cross-engine debris. In both FIGS. 19 and 20, the centerlines of the engines 124, 126 are spaced apart laterally from each other by a centerline-to-centerline lateral distance (d), with the minimum height (h) being determined for a location centered laterally between the engines 124, 126 (i.e., at a lateral distance (d/2) from the centerline of each engine 124, 126). For purposes of illustration (and to identify the centerlines), a horizontal reference line 554 is provided in FIGS. 19 and 20 that extends laterally between the centerlines of the engines 124, 126. Additionally, purposes of discussion, the minimum height (h) is shown as being determined to prevent cross-engine debris from being expelled from a throwing engine (e.g., the second engine 126) and contacting a portion of the other engine (e.g., the first engine 124).

As shown in FIG. 19, the radial dimension (r1) refers to the local maximum radius of the rotating components of the throwing engine (e.g., the second engine 126). For instance, for determining the minimum required height (h) of the shielding tail 500 at the location of the forwardmost rotating airfoils of the engine 126, the radial dimension (r1) may correspond to the maximum radius of the fan blades 232 whereas, for determining the minimum required height (h) of the shielding tail 500 at the location of the aftmost rotating airfoils of the engine 126, the radial dimension (r1) may correspond to the maximum radius of the rotating airfoils of the low pressure turbine 214. Additionally, as shown in FIG. 19, the radial dimension (r2) refers to the desired radial protection or offset distance for the non-throwing engine (e.g., the first engine 124). In the illustrated embodiment, the radial dimension (r2) is selected, for example, as the local outer radius of the engine 124 (e.g., the local outer radius of the nacelle 240 of the engine 124). However, in other embodiments, the radial dimension (r2) may be selected to be larger than the local outer radius of the engine 124 to provide an additional buffer or clearance region for the engine 124 in terms of protection against cross-engine debris. Moreover, due to the direction of rotation of the throwing engine (e.g., as indicated by arrow 550 for the second engine 126), a cross-engine throw line 551 may be defined that extends tangentially from the radial dimension (r1) defined by the second engine 126 to the radial dimension (r2) defined by the first engine 124. By doing so, a cross-engine throw angle (θ) may similarly be defined relative to the cross-engine throw line 551. In view of the above and based on the geometric relationships shown in FIG. 19, the minimum required height (h) of the shielding tail 500 (along with the cross-engine throw angle and associated values a and b) may be calculated according to the following relationships:

$$\theta = \sin^{-1}\left(\frac{r1 + r2}{d}\right)$$

$$a = \frac{r1}{\sin\theta}$$

$$b = \left(\frac{d}{2}\right) - a$$

$$h = b * \tan\theta$$

wherein h corresponds to the minimum required height for the shielding tail, θ corresponds to cross-engine throw angle, r1 corresponds to the local maximum radius of the rotating components of the throwing engine, r2 corresponds to the desired radial offset or protection distance for the opposed, non-throwing engine, d corresponds to lateral centerline-to-centerline distance between the engines, and values a and b correspond to lateral distances that are calculated based on other known values using the equations listed above.

FIG. 20 shows a similar calculation scheme for the minimum required height (h) except that the throwing engine (e.g., the second engine 126) is shown as rotating in the opposite direction (e.g., as indicated by arrow 552). In such instance, as opposed to being capable of throwing debris towards the opposed engine 124 from its underside, cross-engine debris from the second engine 126 will be directed from its topside towards the first engine 124. With such a rotational direction 552 of the engine 126, a cross-engine throw line 553 may be defined that extends tangentially from the radial dimension (r1) defined by the second engine 126 along its top side to the radial dimension (r2) defined by the first engine 124. By doing so, a cross-engine throw angle (θ) may be defined relative to the cross-engine throw line 552. In view of the above and based on the geometric relationships shown in FIG. 20, the minimum required height (h) of the shielding tail 500 (along with the cross-engine throw angle and associated values a and b) may be calculated according to the following relationships:

$$\theta = \sin^{-1}\left(\frac{r2 - r1}{d}\right)$$

$$a = \frac{r1}{\sin\theta}$$

$$b = \left(\frac{d}{2}\right) * \tan\theta$$

$$h = a + b$$

wherein h corresponds to the minimum required height for the shielding tail, θ corresponds to cross-engine throw angle, r1 corresponds to the local maximum radius of the rotating components of the throwing engine, r2 corresponds to the desired radial offset or protection distance for the opposed, non-throwing engine, d corresponds to lateral centerline-to-centerline distance between the engines, and values a and b correspond to vertical distances that are calculated based on other known values using the equations listed above.

As indicated above, the minimum required height for the shielding tail 500 may vary depending on numerous factors, including the local maximum radius of the rotating components of the throwing engine (e.g., radial dimension r1), the rotational direction of the throwing engine (e.g., direction 550, 552), the desired radial offset or protection distance for the non-throwing engine (e.g., radial dimension r2), and the lateral distance between the engines (e.g., the centerline-to-centerline distance (d)). It should also be appreciated that, depending on the relative rotational directions of the engines 124, 126, the calculations described above may be performed for both engines (i.e., by calculating the minimum height assuming the first engine 124 is the throwing engine and calculating the minimum height assuming the second engine 126 is the throwing engine), with the largest value for the minimum height being utilized for the shielding tail to ensure proper cross-engine debris protection.

As described above, the present subject matter, in one aspect, discloses surface features for a blended wing aircraft that project or extend outwardly from an adjacent surface of the aircraft to allow the surface features to interact with the boundary layer air being directed towards the inlet of the nacelle of each engine or the boundary layer air actually flowing through the nacelle, reducing the impact of the boundary layer ingestion within the engine (e.g., by preventing a stalled condition). These surface features may be configured to reduce the amount of turbulence in the boundary layer air, such as by straightening the flow of boundary layer air and/or be introducing an amount of pre-swirl into the boundary layer air at a location of upstream of the respective fan. Additionally, in another aspect, the present subject matter discloses shielding-related features for a blended wing aircraft. Specifically, the shielding-related features may be configured to protect the aircraft (including the blended wing body and the engines) from damage caused by kinetic forces originating from an engine, such as when fragments of a rotary component of the engine are thrown or directed outwardly from the engine due to rotary failure or component failure.

Further aspects are provided by the subject matter of the following clauses:

A blended wing aircraft, comprising: a blended wing body; an engine including a nacelle defining an inlet and an outlet, the engine further including a fan positioned within the nacelle between the inlet and the outlet, the engine being supported relative to the blended wing body such that the inlet of the nacelle is configured to receive boundary layer air from the blended wing body; and a plurality of surface features positioned upstream of the fan, each surface feature of the plurality of surface features comprising a projection extending outwardly from an adjacent surface of the blended wing aircraft such that the projection is configured to interact with the boundary layer air.

The blended wing aircraft of any preceding clause, wherein the plurality of surface features are positioned within the nacelle at a location upstream of the fan and downstream of the inlet of the nacelle.

The blended wing aircraft of any preceding clause, wherein the plurality of surface features are provided along an inner surface of the nacelle in an arced array extending from the bottom end of the inlet.

The blended wing aircraft of any preceding clause, wherein a bottom end of the inlet of the nacelle is recessed relative to an adjacent base profile surface of the blended wing body such that a differential height is defined between the bottom end of the inlet and the adjacent base profile surface of the blended wing body.

The blended wing aircraft of any preceding clause, wherein the plurality of surface features are provided along an inner surface of the nacelle in an arced array extending from the bottom end of the inlet, the arced array defining an array height relative to the bottom end of the inlet that is greater than the differential height.

The blended wing aircraft of any preceding clause, wherein the plurality of surface features are positioned upstream of the inlet of the nacelle.

The blended wing aircraft of any preceding clause, wherein the adjacent surface comprises an outer surface of the blended wing body.

The blended wing aircraft of any preceding clause, wherein each surface feature of the plurality of surface features extends in a lengthwise direction between an upstream end and a downstream end and extends outwardly from the adjacent surface in a heightwise direction between a proximal end and a distal end.

The blended wing aircraft of any preceding clause, wherein each surface feature of the plurality of surface features defines an airfoil shape or a non-airfoil shape in the lengthwise direction.

The blended wing aircraft of any preceding clause, wherein each surface feature of the plurality of surface features defines a length in the lengthwise direction between the upstream and downstream ends of the surface feature and defines a height in the heightwise direction between the proximal and distal ends of the projection, the height varying along at least a portion of the length of the surface feature.

The blended wing aircraft of any preceding clause, wherein the height increases over a first sloped section of the surface feature extending in the lengthwise direction from the upstream end of the surface feature and wherein the height decreases over a second sloped section of the surface feature extending in the lengthwise direction to the downstream end of the surface feature.

The blended wing aircraft of any preceding clause, wherein the plurality of surface features are oriented parallel to one another along the adjacent surface of the blended wing aircraft.

The blended wing aircraft of any preceding clause, wherein one or more of the plurality of surface features are oriented non-parallel to one or more other of the plurality of surface features along the adjacent surface of the blended wing aircraft.

The blended wing aircraft of any preceding clause, wherein the plurality of surface features comprises a first set of surface features oriented lengthwise at a positive skew angle relative to a reference line extending parallel to an axial centerline of the engine aircraft and a second set of surface features oriented lengthwise at a negative skew angle relative to the reference line.

The blended wing aircraft of any preceding clause, wherein the plurality of surface features further comprises a third set of surface features positioned between the first and second sets of surface features, the third set of surface features being oriented lengthwise parallel to the reference line.

A blended wing aircraft, comprising: a blended wing body extending in a longitudinal direction between a forward end of the blended wing body and an aft end of the blended wing body, the blended wing body extending in a lateral direction perpendicular to the longitudinal direction; a first engine supported relative to the blended wing body, the first engine having a first forwardmost rotating airfoil and a first aftmost rotating airfoil; a second engine supported relative to the blended wing body, the second engine being spaced apart from the first engine in the lateral direction, the second engine having a second forwardmost rotating airfoil and a second aftmost rotating airfoil; and a shielding tail extending outwardly from the blended wing body at a location between the first and second engines in the lateral direction, the shielding tail extending in the longitudinal direction between a forward tail end and an aft tail end, the forward tail end being aligned with or positioned forward of the first and second forwardmost rotating airfoils in the longitudinal direction, the aft tail end being aligned with or positioned aft of the first and second aftmost rotating airfoils in the longitudinal direction.

The blended wing aircraft of any preceding clause, wherein the shielding tail defines a height relative to a centerline of at least one of first engine or the second engine that is equal to at least a minimum height, the minimum height being determined as a function of a radius of at least one of the first forwardmost rotating airfoil, the first aftmost rotating airfoil, the second forwardmost rotating airfoil, or the second aftmost rotating airfoil.

The blended wing aircraft of any preceding clause, wherein the minimum height varies along an axial length of the first and second engines, the minimum height decreasing as the first and second engines extend in the longitudinal direction from a location of the first and second forwardmost airfoils to a location of the first and second aftmost airfoils.

The blended wing aircraft of any preceding clause, wherein the height of the shielding tail varies as the shielding tail extends in the longitudinal direction between its forward and aft tail ends.

The blended wing aircraft of any preceding clause, further comprising one or more shielding panels provided in association with the blended wing body, the one or more shielding panels included within a shielded section of the blended wing body, the shielded section extending in the longitudinal direction between a forward shield end and an aft shield end, the forward shield end being aligned with or positioned forward of the first and second forwardmost rotating airfoils in the longitudinal direction, the aft shield end being aligned with or positioned aft of the first and second aftmost rotating airfoils in the longitudinal direction.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A blended wing aircraft, comprising:

a blended wing body;

an engine including a nacelle defining an inlet and an outlet, the engine further including a fan positioned within the nacelle between the inlet and the outlet, the engine being supported relative to the blended wing body such that the inlet of the nacelle is configured to receive boundary layer air from the blended wing body; and a plurality of surface features positioned upstream of the fan within the nacelle at a location upstream of the fan and downstream of the inlet of the nacelle, each surface feature of the plurality of surface features comprising a projection extending outwardly from an adjacent surface of the blended wing aircraft such that the projection is configured to interact with the boundary layer air;

wherein a bottom end of the inlet of the nacelle is recessed relative to an adjacent base profile surface of the blended wing body and defines a recessed inlet channel; and wherein the plurality of surface features are provided within the recessed inlet channel.

2. The blended wing aircraft of claim 1, wherein the plurality of surface features are provided along an inner surface of the nacelle in an arced array extending from a bottom end of the inlet.

3. The blended wing aircraft of claim 1, wherein a differential height is defined between the bottom end of the recessed inlet channel and the adjacent base profile surface of the blended wing body.

4. The blended wing aircraft of claim 3, wherein the plurality of surface features are provided along an inner surface of the nacelle in an arced array extending from the bottom end of the inlet, the arced array defining an array height relative to the bottom end of the inlet that is greater than the differential height.

5. The blended wing aircraft of claim 1, wherein the plurality of surface features are positioned upstream of the inlet of the nacelle.

6. The blended wing aircraft of claim 5, wherein the adjacent surface comprises an outer surface of the blended wing body.

7. The blended wing aircraft of claim 1, wherein each surface feature of the plurality of surface features extends in a lengthwise direction between an upstream end and a downstream end and extends outwardly from the adjacent surface in a heightwise direction between a proximal end and a distal end.

8. The blended wing aircraft of claim 7, wherein each surface feature of the plurality of surface features defines an airfoil shape or a non-airfoil shape in the lengthwise direction.

9. The blended wing aircraft of claim 7, wherein each surface feature of the plurality of surface features defines a length in the lengthwise direction between the upstream and downstream ends of the surface feature and defines a height in the heightwise direction between the proximal and distal ends of the surface feature, the height varying along at least a portion of the length of the surface feature.

10. The blended wing aircraft of claim 9, wherein the height increases over a first sloped section of the surface feature extending in the lengthwise direction from the upstream end of the surface feature and wherein the height decreases over a second sloped section of the surface feature extending in the lengthwise direction to the downstream end of the surface feature.

11. The blended wing aircraft of claim 1, wherein the plurality of surface features are oriented parallel to one another along the adjacent surface of the blended wing aircraft.

12. The blended wing aircraft of claim 1, wherein one or more of the plurality of surface features are oriented non-parallel to one or more other of the plurality of surface features along the adjacent surface of the blended wing aircraft.

13. The blended wing aircraft of claim 12, wherein the plurality of surface features comprises a first set of surface features oriented lengthwise at a positive skew angle relative to a reference line extending parallel to an axial centerline of the engine and a second set of surface features oriented lengthwise at a negative skew angle relative to the reference line.

14. The blended wing aircraft of claim 13, wherein the plurality of surface features further comprises a third set of surface features positioned between the first and second sets of surface features, the third set of surface features being oriented lengthwise parallel to the reference line.

15. A blended wing aircraft, comprising:

a blended wing body extending in a longitudinal direction between a forward end of the blended wing body and an aft end of the blended wing body, the blended wing body extending in a lateral direction perpendicular to the longitudinal direction;

a first engine supported relative to the blended wing body, the first engine having a first forwardmost rotating airfoil and a first aftmost rotating airfoil;

a second engine supported relative to the blended wing body, the second engine being spaced apart from the first engine in the lateral direction, the second engine having a second forwardmost rotating airfoil and a second aftmost rotating airfoil; and a shielding tail extending outwardly from the blended wing body at a location between the first and second engines in the lateral direction, the shielding tail extending in the longitudinal direction between a forward tail end and an aft tail end, the forward tail end being aligned with or positioned forward of the first and second forwardmost rotating airfoils in the longitudinal direction, the aft tail end being aligned with or positioned aft of the first and second aftmost rotating airfoils in the longitudinal direction.

16. The blended wing aircraft of claim 15, wherein the shielding tail defines a height relative to a centerline of at least one of first engine or the second engine that is equal to at least a minimum height, the minimum height being determined as a function of a radius of at least one of the first forwardmost rotating airfoil, the first aftmost rotating airfoil, the second forwardmost rotating airfoil, or the second aftmost rotating airfoil.

17. The blended wing aircraft of claim 16, wherein the minimum height varies along an axial length of the first and second engines, the minimum height decreasing as the first and second engines extend in the longitudinal direction from a location of the first and second forwardmost rotating airfoils to a location of the first and second aftmost rotating airfoils.

18. The blended wing aircraft of claim 16, wherein the height of the shielding tail varies as the shielding tail extends in the longitudinal direction between its forward and aft tail ends.

19. The blended wing aircraft of claim 15, further comprising one or more shielding panels provided in association with the blended wing body, the one or more shielding panels included within a shielded section of the blended wing body, the shielded section extending in the longitudinal direction between a forward shield end and an aft shield end, the forward shield end being aligned with or positioned forward of the first and second forwardmost rotating airfoils in the longitudinal direction, the aft shield end being aligned with or positioned aft of the first and second aftmost rotating airfoils in the longitudinal direction.

* * * * *